Jan. 27, 1931. W. J. WOODS ET AL 1,790,397
GLASS WORKING MACHINE
Filed April 13, 1927 18 Sheets-Sheet 8

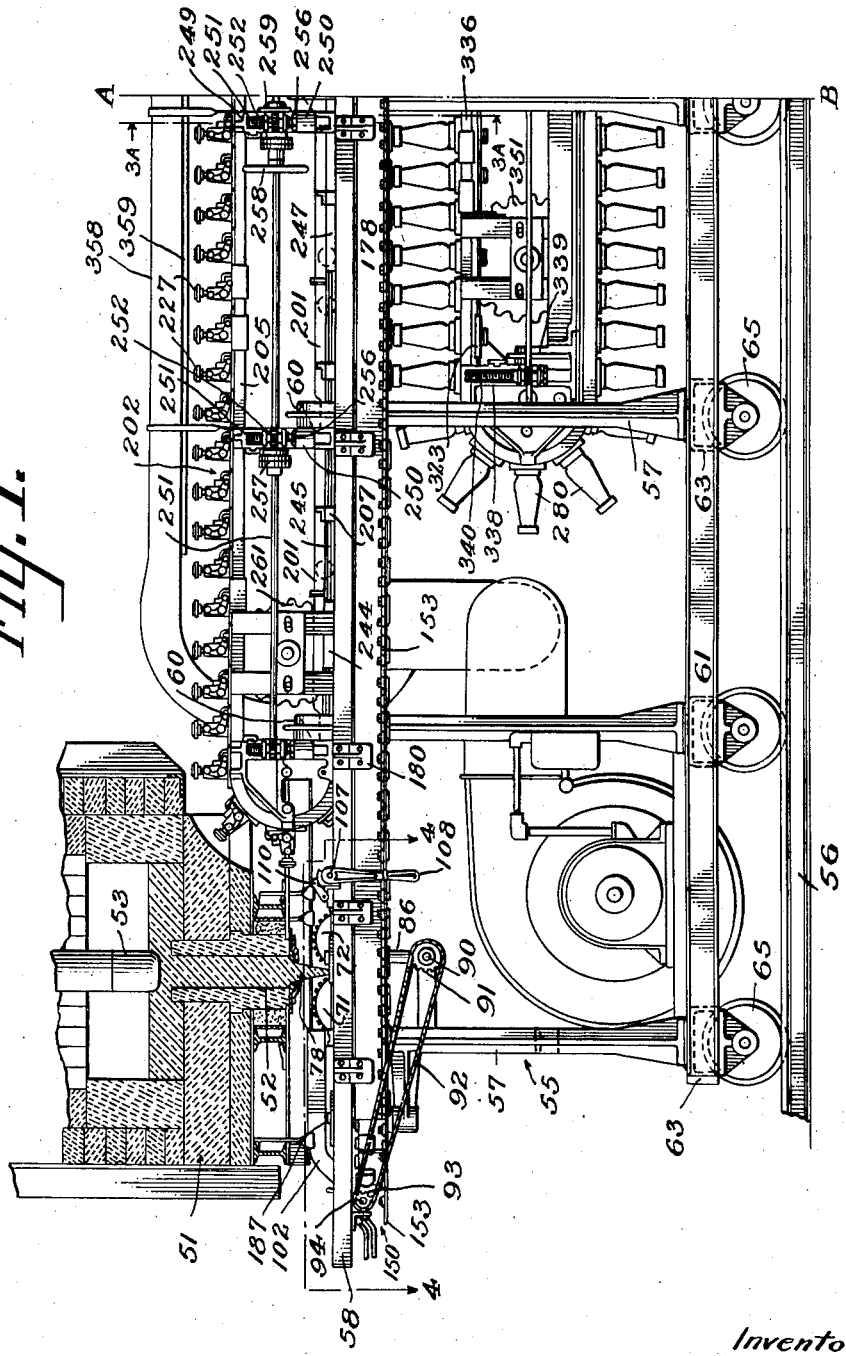

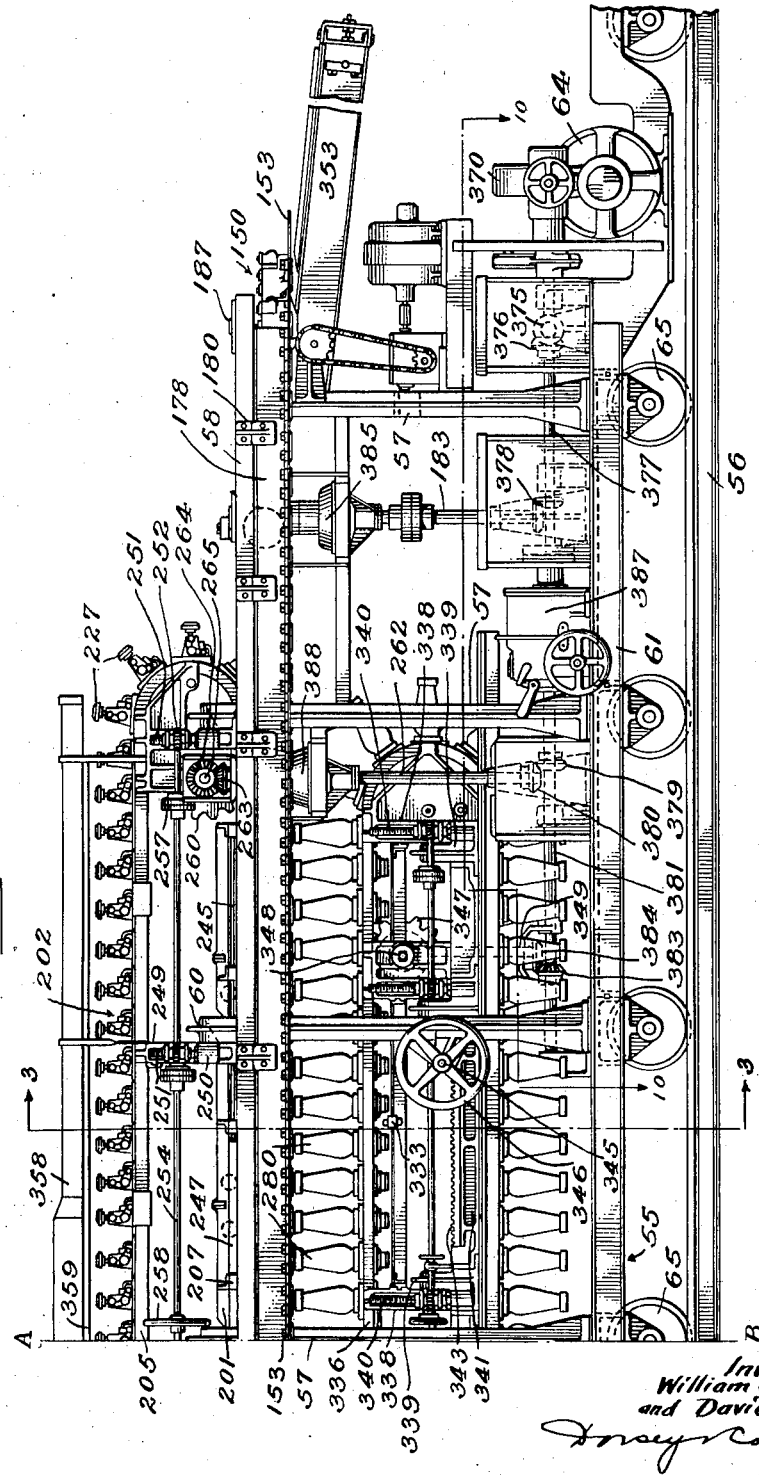

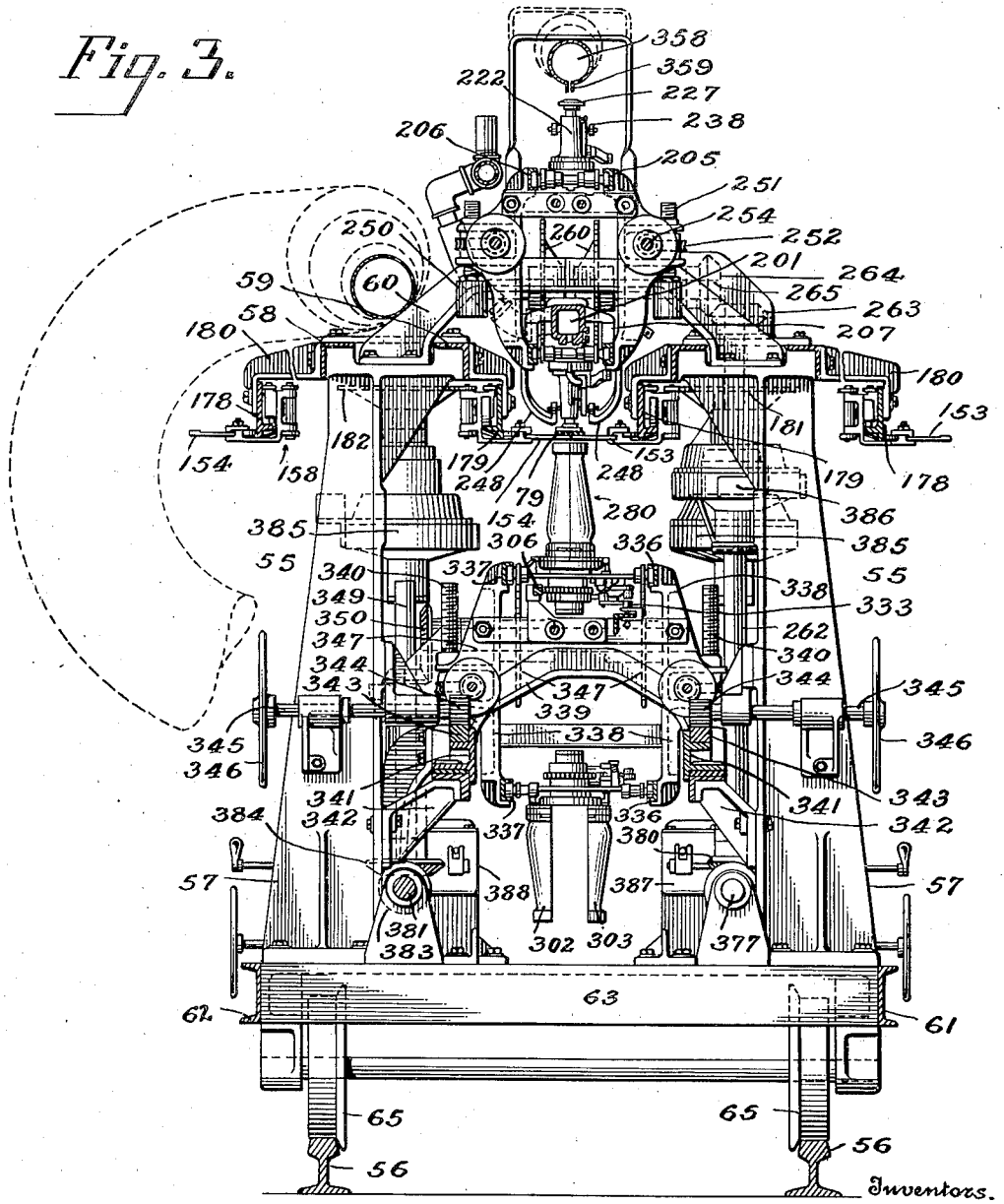

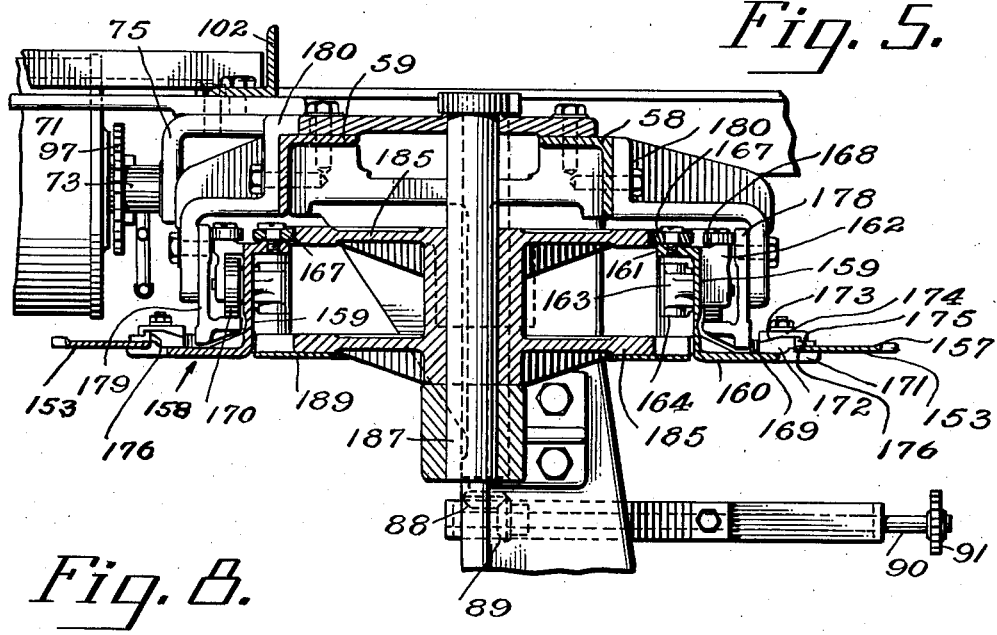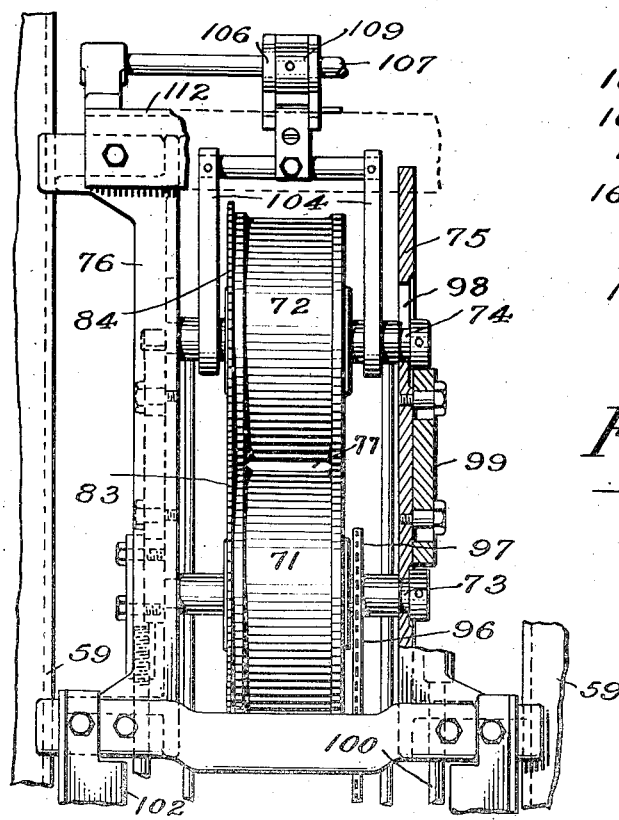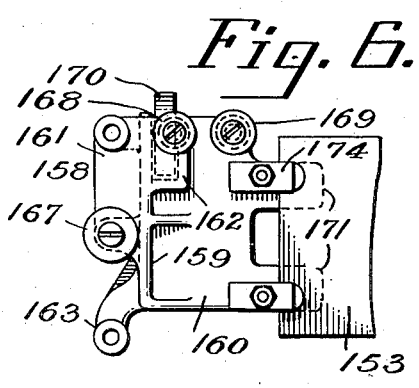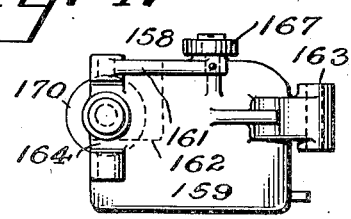

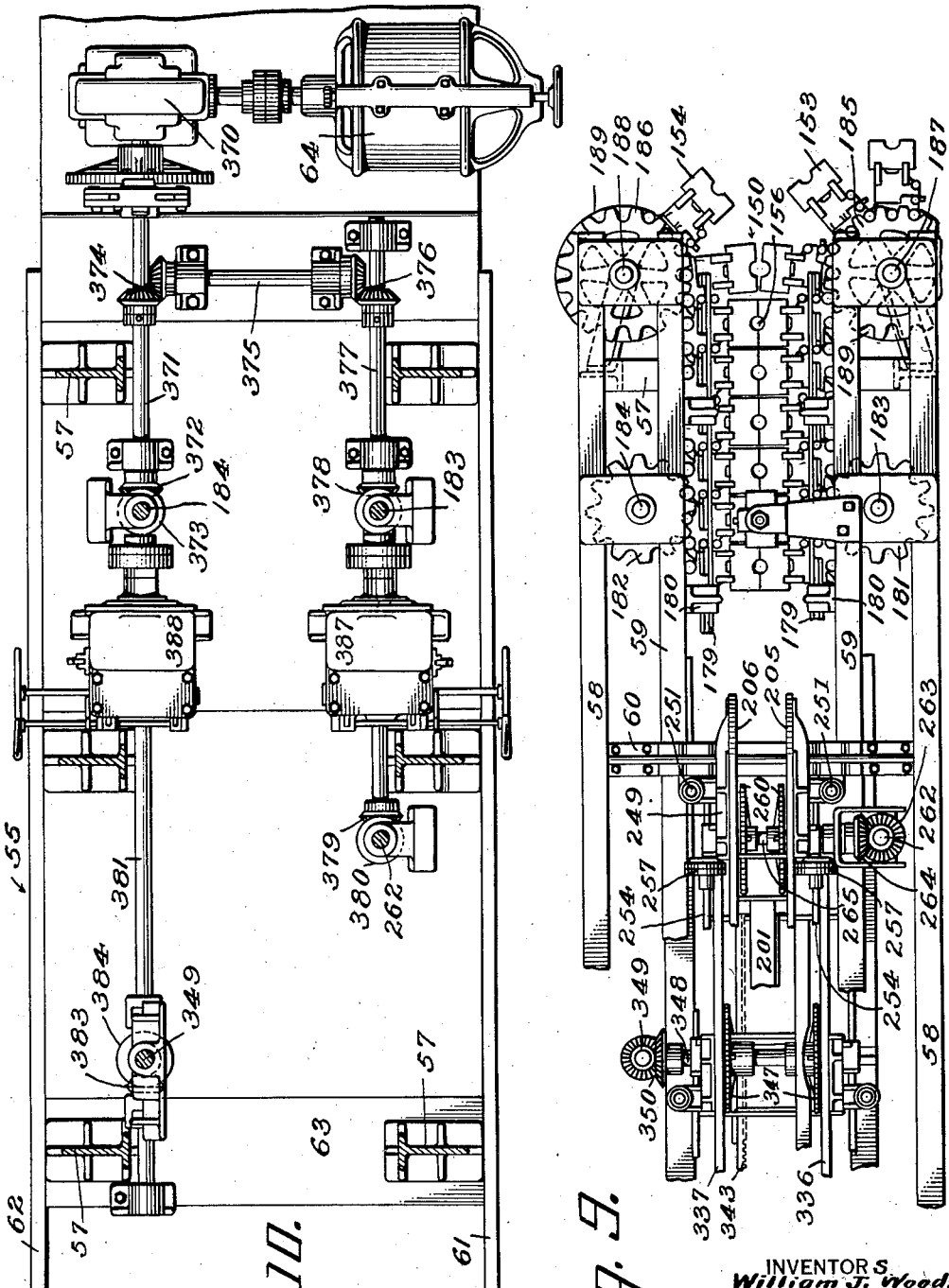

INVENTORS.
William J. Woods
and David E. Gray.
BY
ATTORNEYS.

INVENTORS.
William J. Woods
and David E. Gray,
BY
ATTORNEYS.

Jan. 27, 1931. W. J. WOODS ET AL 1,790,397
GLASS WORKING MACHINE
Filed April 13, 1927 18 Sheets-Sheet 10

INVENTORS
William J. Woods
and David E. Gray
BY
ATTORNEYS

Jan. 27, 1931. W. J. WOODS ET AL 1,790,397
GLASS WORKING MACHINE
Filed April 13, 1927 18 Sheets-Sheet 11
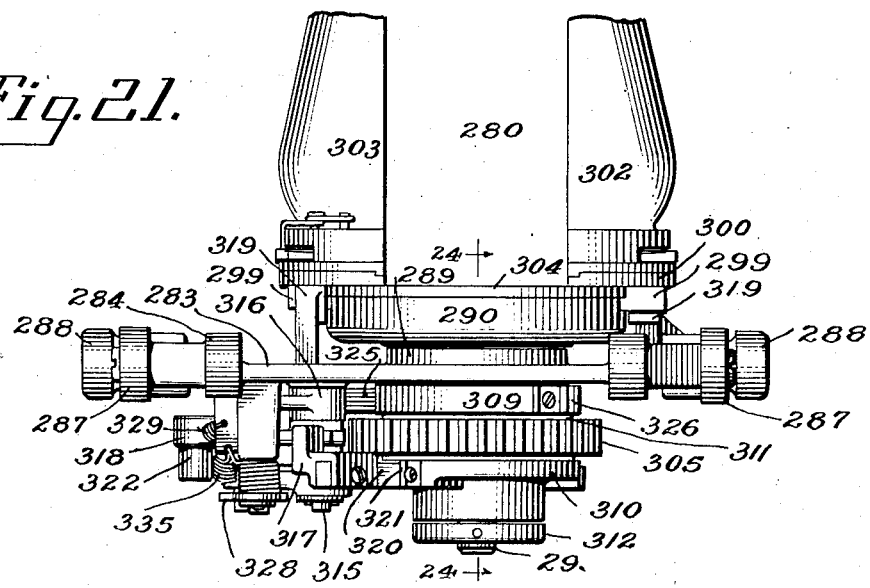
Fig. 21.
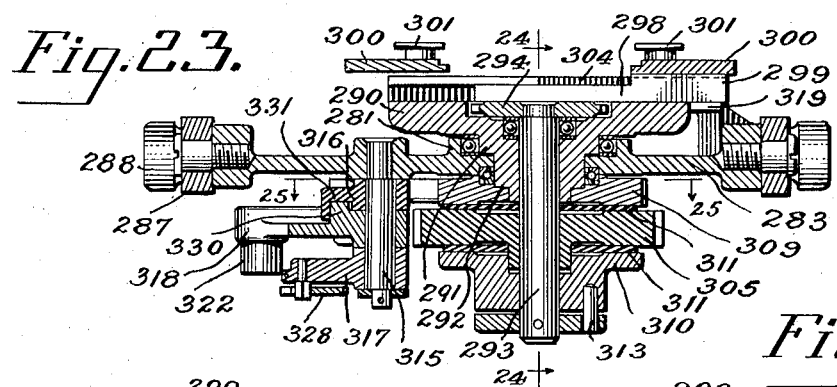
Fig. 23.
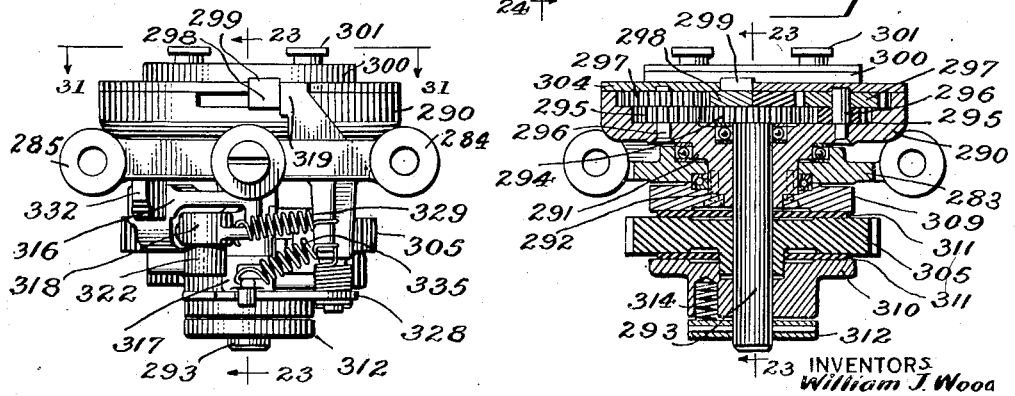
Fig. 22.
Fig. 24.
INVENTORS
William J. Wood
and David E. Gray
BY
ATTORNEYS.

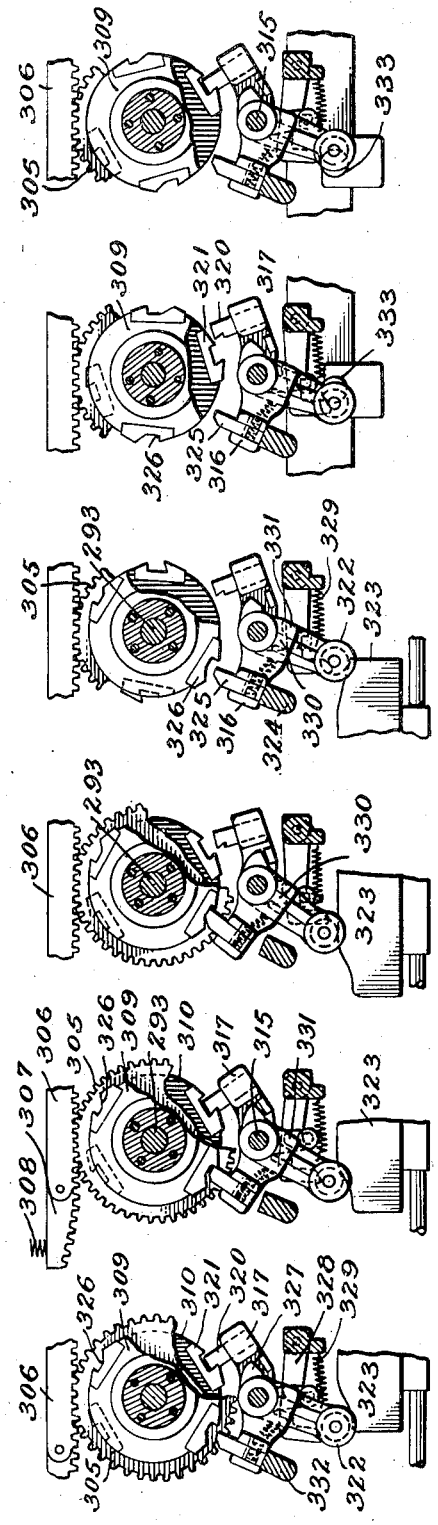
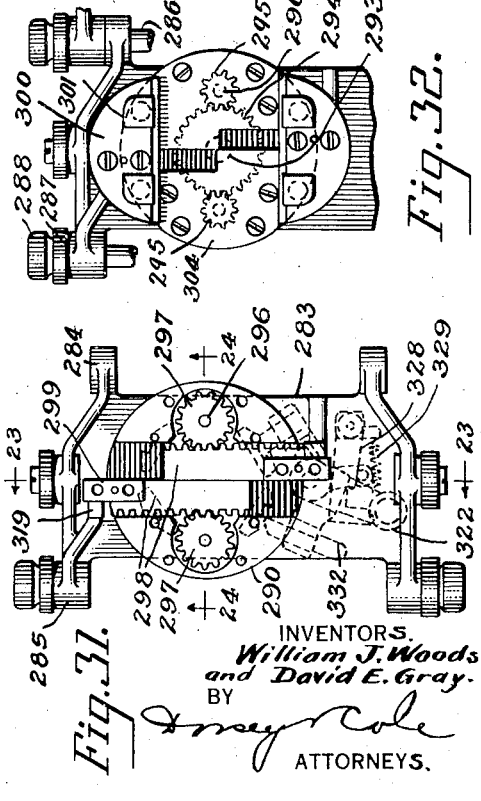

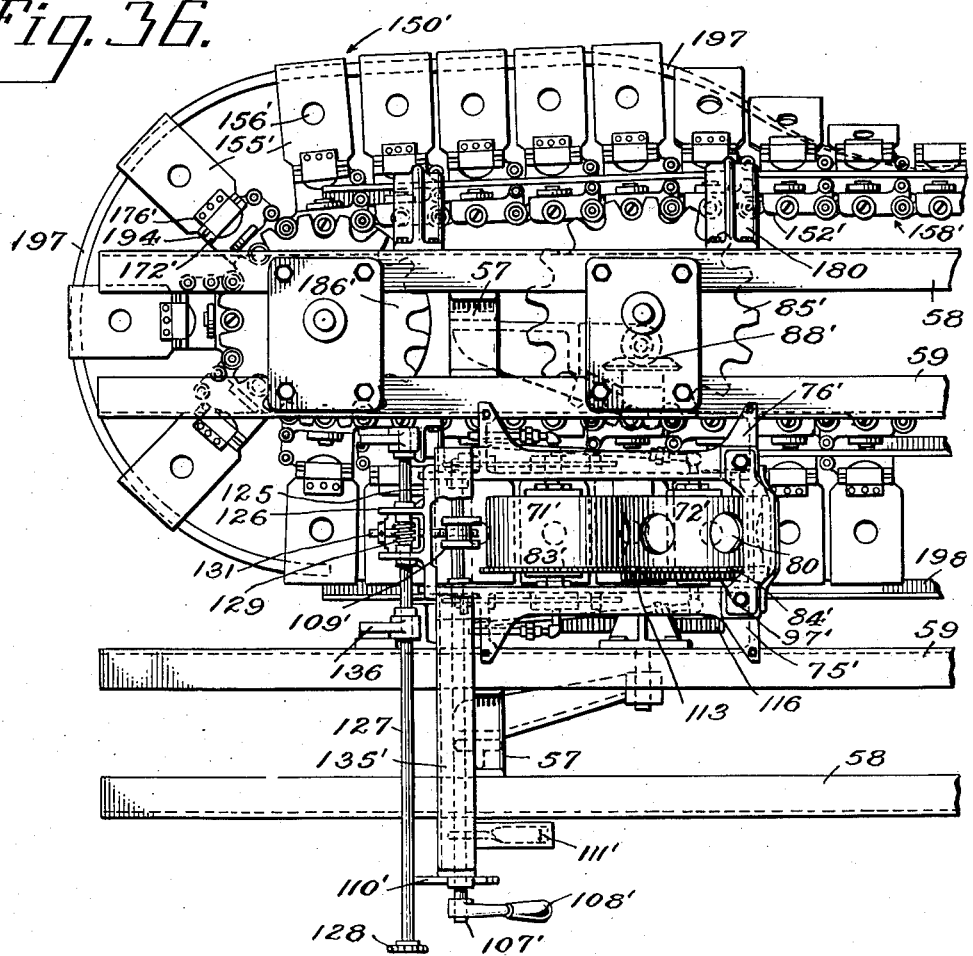
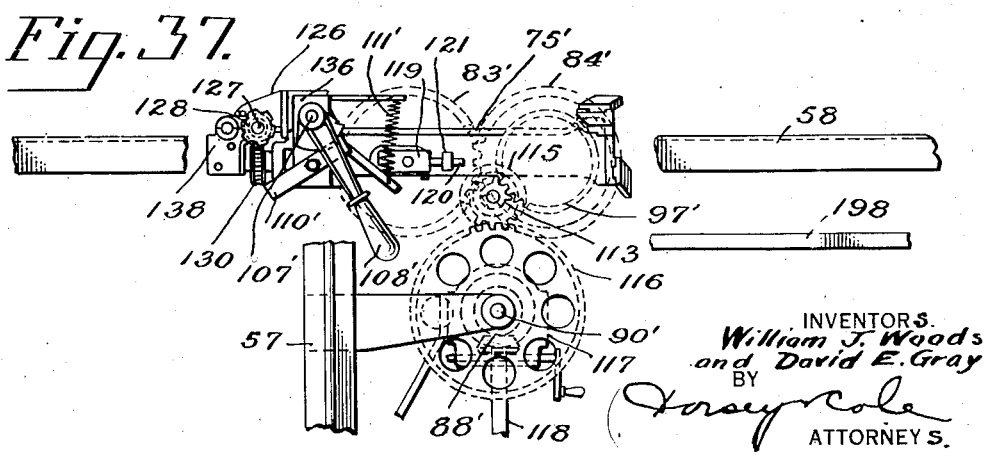

Jan. 27, 1931.   W. J. WOODS ET AL   1,790,397
GLASS WORKING MACHINE
Filed April 13, 1927   18 Sheets-Sheet 15

INVENTORS.
William J. Wood
and David E. Gray
BY
Insey Cole
ATTORNEYS.

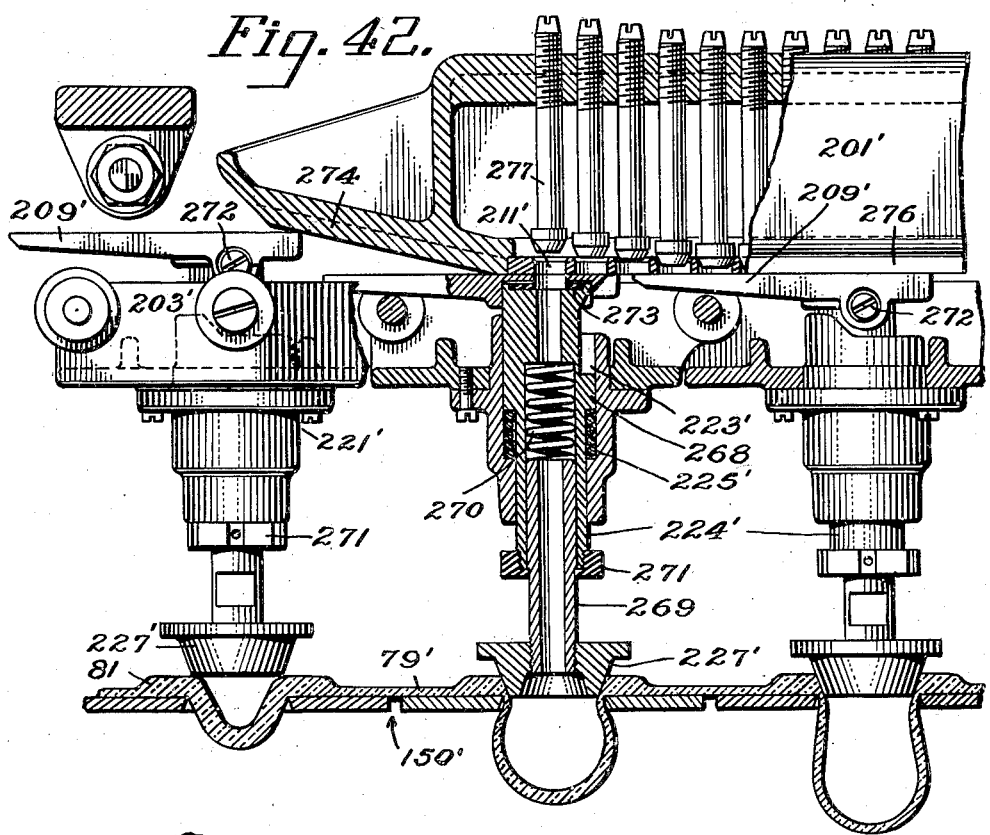
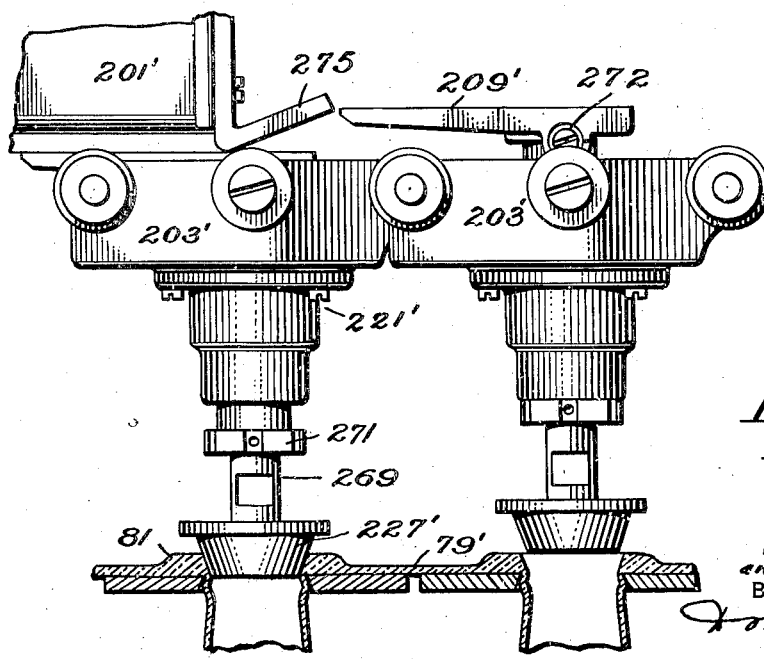

Jan. 27, 1931.  W. J. WOODS ET AL  1,790,397
GLASS WORKING MACHINE
Filed April 13, 1927   18 Sheets-Sheet 18
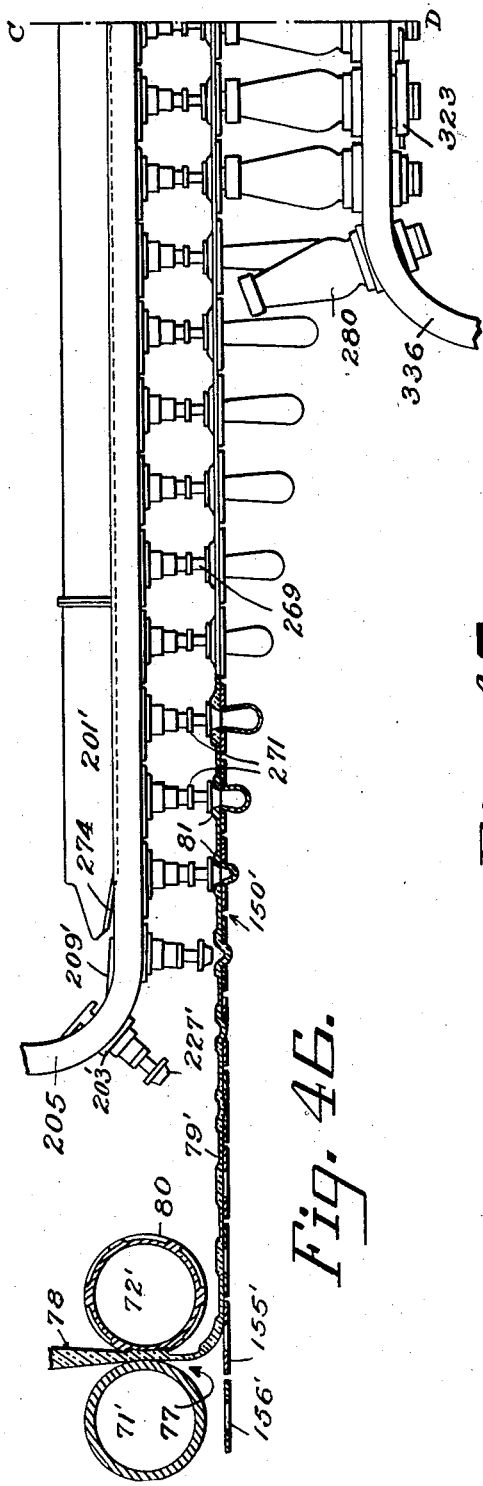
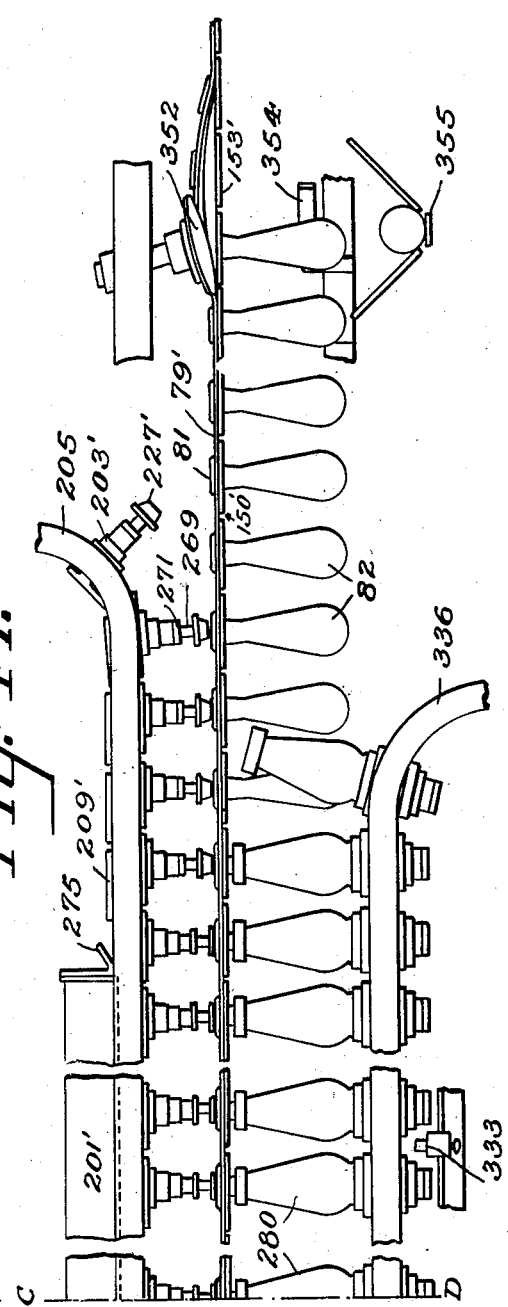
INVENTORS.
*William J. Woods*
and *David E. Gray.*
BY
Dorsey Cole
ATTORNEYS.

Patented Jan. 27, 1931

1,790,397

UNITED STATES PATENT OFFICE

WILLIAM J. WOODS AND DAVID E. GRAY, OF CORNING, NEW YORK, ASSIGNORS TO CORNING GLASS WORKS, OF CORNING, NEW YORK, A CORPORATION OF NEW YORK

GLASS-WORKING MACHINE

Application filed April 13, 1927. Serial No. 183,491.

This invention has for its object to provide a novel process and apparatus for the manufacture of blown glass articles. The apparatus herein shown has been designed for the manufacture of paste mold ware, although it will be readily understood that, by suppressing certain features herein shown, iron mold ware may be produced.

Prior to this invention such articles have generally been made by some process involving the collection on a blowing iron or in a mold of a mass of plastic glass, separating such mass from the parent body from which it was collected, and blowing the separated mass to form.

In the full process herein described in detail, the article is blown to form from a portion of a continuous ribbon of plastic glass, from other portions of which other similar articles are being formed, the formation of all of said articles being progressive and sequential.

The apparatus herein shown and described includes:

1. Means for forming a continuous ribbon of plastic glass. This is shown in the form of a tank forehearth having a submerged flow orifice and a pair of rolls with a forming pass located below the orifice, through which glass from the orifice passes, and by which, during such passage, the glass is flattened to a ribbon.

2. An endless ribbon carrying conveyor adapted to receive the continuous ribbon from the rolls and having, at intervals therein, apertures through which portions of the ribbon sag to be subsequently blown to shape.

3. An endless series of blowheads moving in unison with the conveyor and above a portion of the operative run thereof, with controllable means for admitting blowing air to each of said heads at predetermined pressures during selected portions of the said run.

4. An endless series of molds moving with the conveyor and below a selected portion of the run thereof with automatic means for opening and closing the molds. The molds are provided with means for rotating them during their travel and for arresting such rotation when they are in such position that, if opened from such position, they will move away from the center line of their path of translatory movement.

It will be understood that several of the steps herein described and the mechanism for carrying them out as herein disclosed are applicable when used with different prior or subsequent steps, and with different mechanisms for performing the same.

Referring to the accompanying drawings, in which corresponding parts are designated by corresponding marks of reference:

Figs. 1 and 2 together constitute a side elevational view of a complete machine embodying this invention, Fig. 1 showing the machine from its feed end to approximately its middle portion and Fig. 2 showing the machine from this intermediate point to the delivery end;

Fig. 3 is a transverse vertical section on the line 3—3 of Fig. 2, showing the relation of the orifice plate, blowhead, and mold mechanisms;

Fig. 5 is a transverse vertical section on the line 5—5 of Fig. 4;

Figs. 6 and 7 are plan and side elevations, respectively, of one of the links of the ribbon conveyor;

Fig. 8 is an enlarged plan view of the roll unit shown in Fig. 4;

Fig. 9 is a plan view of the delivery end of the machine with parts removed;

Fig. 10 is a sectional plan view of the driving mechanism on the line 10—10 of Fig. 2;

Figure 4:
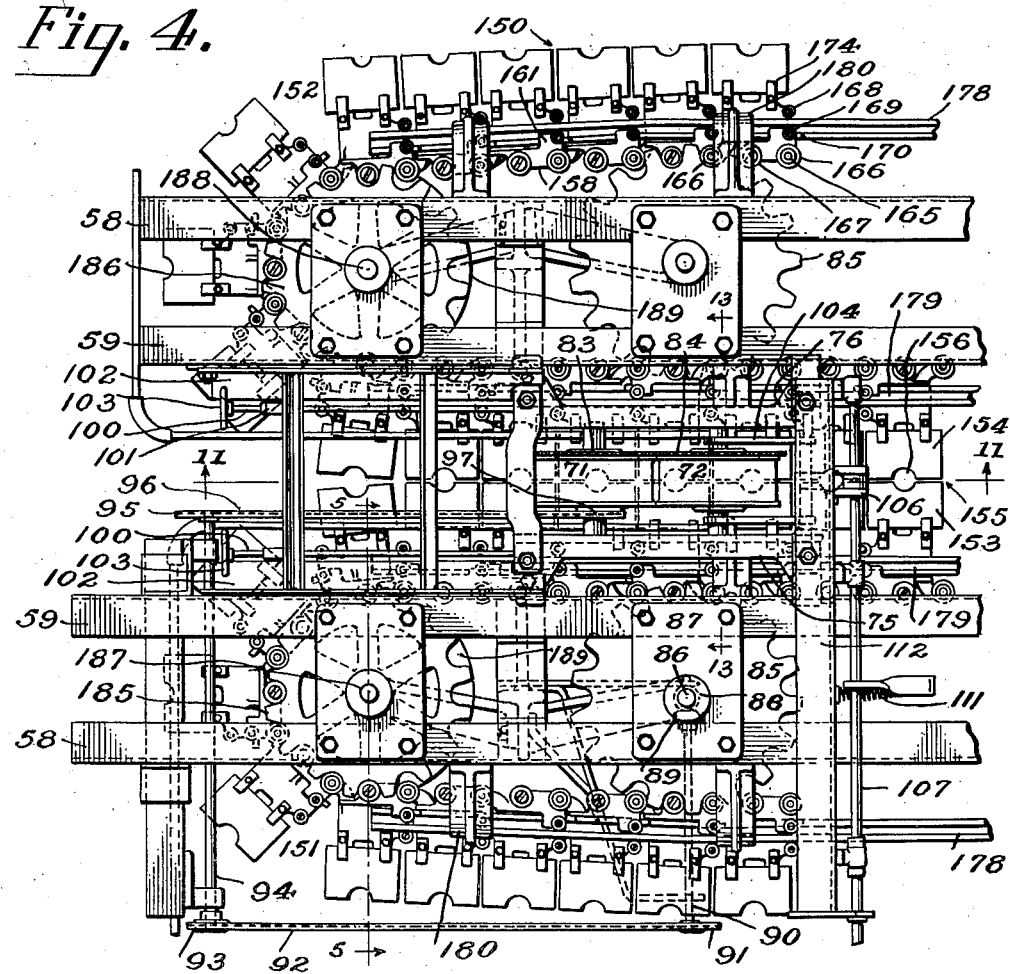
Fig. 4 is a sectional plan view, on the line 4—4 of Fig. 1, showing the feed end of the machine.
Figure 38:
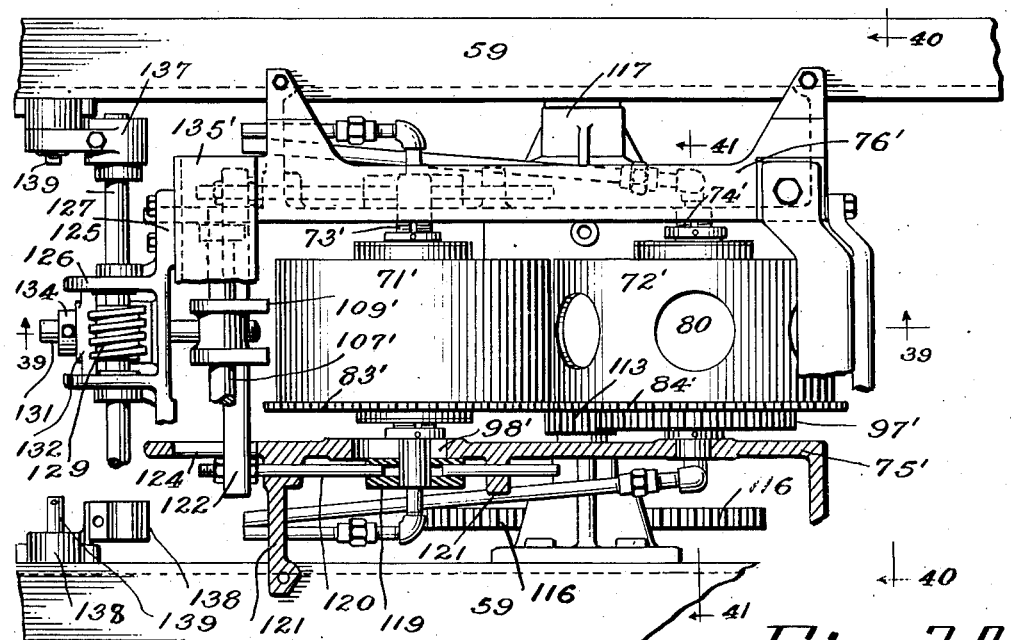
Figure 39:
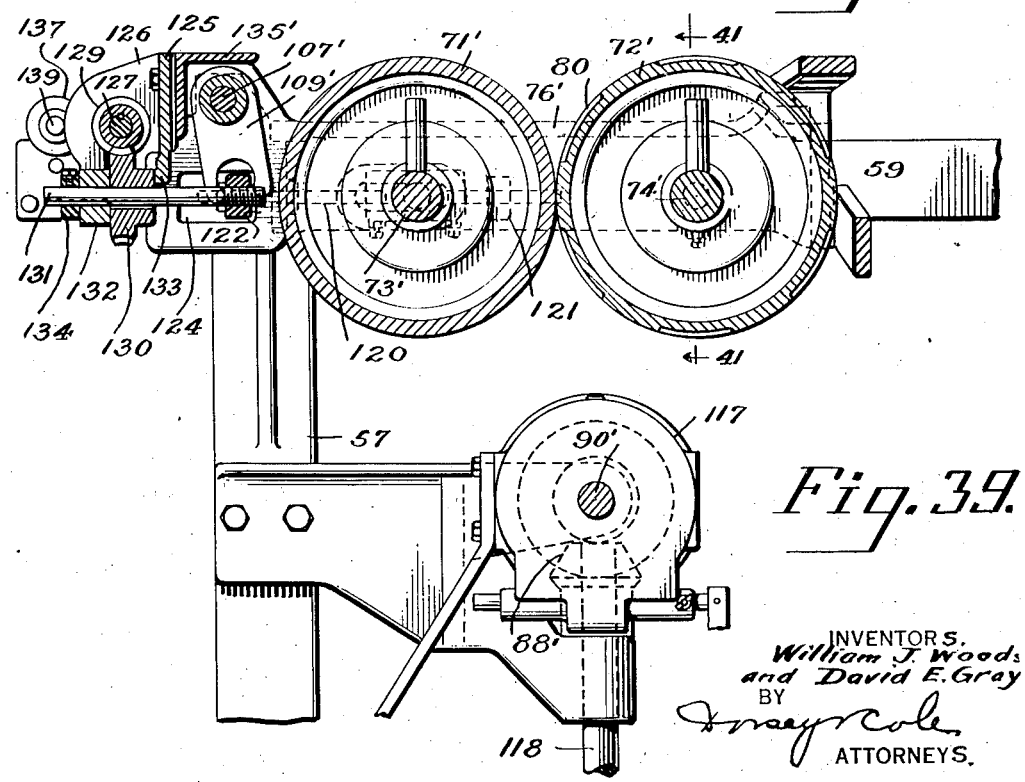
Figure 40:
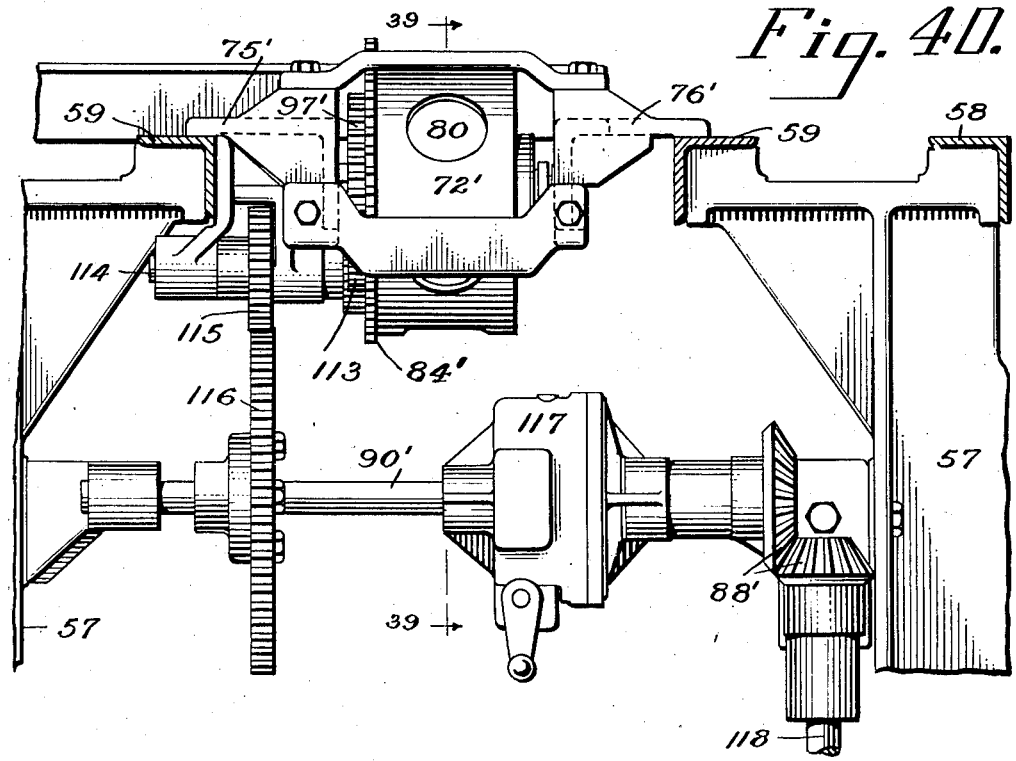
Figure 41:
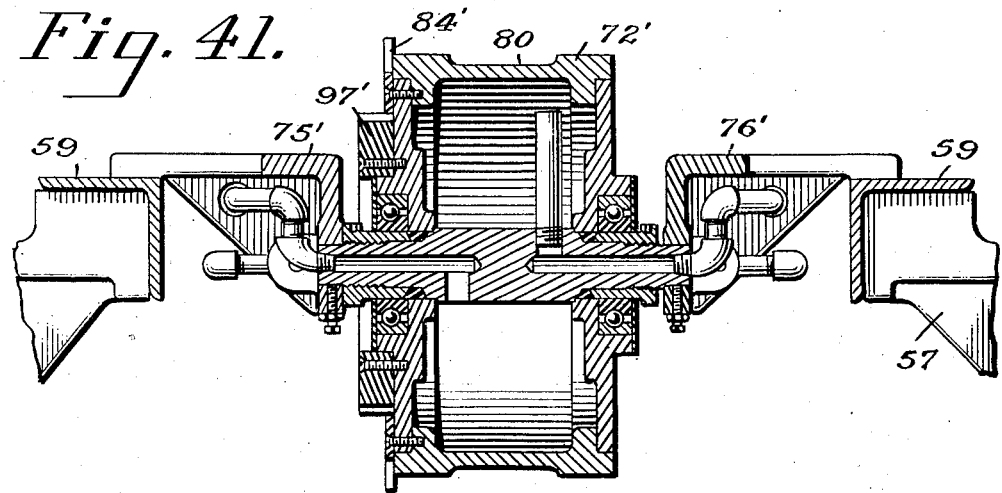
Figure 44:
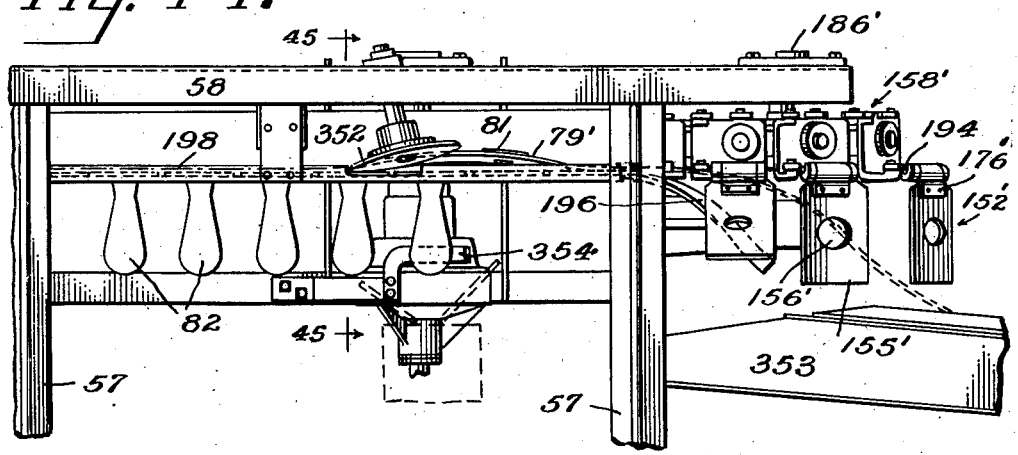
Figure 45:
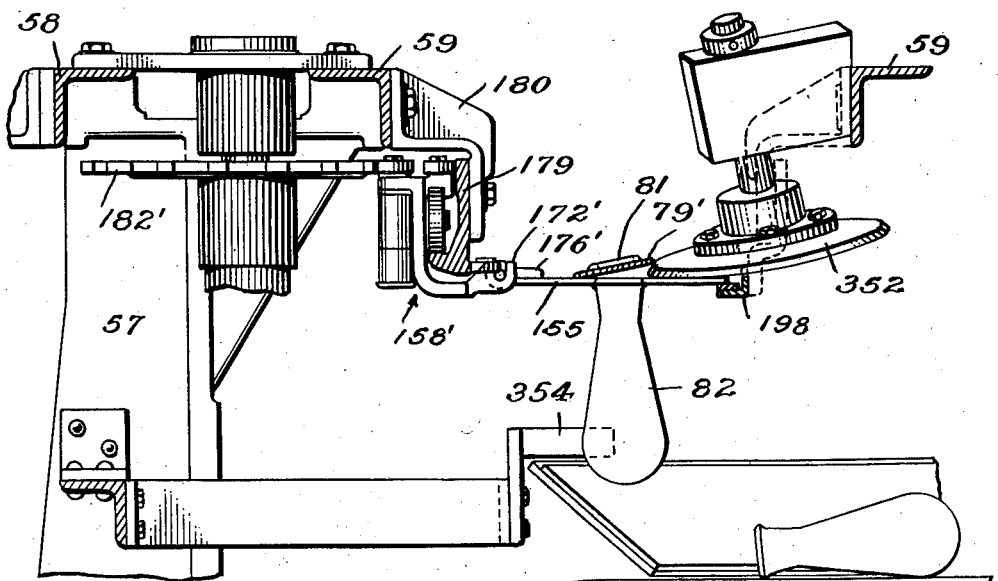

Figs. 21–24 are detail views of a mold carrier unit, Fig. 21 being an end elevation, Fig. 22 a side elevation, Fig. 23 a transverse vertical section on the line 23—23 of Figs. 22, 24, and 31, and Fig. 24 a longitudinal vertical section on the line 24—24 of Figs. 21, 23, 31;

Figs. 25–30 are horizontal sectional details of the mold carrier mechanism on the line 25—25 of Fig. 23, just above the latch mechanism, showing the successive positions of the operative cycle;

Figs. 31–35 are horizontal sectional details of the mold carrier mechanism on the line 31—31 of Fig. 22, parts being removed in Fig. 31, showing the opening and closing means and the successive positions of the mold carrier segments;

Fig. 36 is a fragmental sectional plan view of a machine, embodying this invention, but differing in certain respects from that shown in the preceding figures, showing the feed end of the machine, the single orifice drop plates, and the pocket rolls, this view corresponding in general to Fig. 4;

Fig. 37 is a side elevation of the machine of Fig. 36, showing the pocket rolls, release mechanism and timing adjustment therefor;

Fig. 38 is an enlarged plan view of the roll unit shown in Fig. 36;

Fig. 39 is a longitudinal vertical section on the line 39—39 of Fig. 38;

Fig. 40 is a transverse vertical section on the line 40—40 of Fig. 38;

Fig. 41 is a transverse vertical section on the line 41—41 of Figs. 38 and 39;

Figs. 42–43 are longitudinal views, partly in section, near the feed and delivery ends, respectively, of a machine embodying the invention of this application, showing blowhead units, a blowbox and a cam differing from those of the preceding figures;

Fig. 44 is a partial side elevation of the delivery end of the machine, such as that shown in Fig. 36, showing the stripper plate and crack-off bar;

Fig. 45 is a transverse vertical section, on an enlarged scale, taken on the line 45—45 of Fig. 44; and Figs. 46 and 47 together constitute a longitudinal central vertical section through the machine shown in Figs. 36–45, with certain parts omitted, Fig. 46 showing the machine from a point near its feed end to approximately its middle portion, and Fig. 47 showing the machine from this intermediate point to a point near the delivery end.

The glass may be melted in a tank of any approved construction (not shown), provided with a forehearth 51 (Figs. 1 and 11) that has a glass issuing orifice 52 in its bottom, the flow of glass through the orifice being controlled by a regulator 53.

The bottom of the forehearth is raised sufficiently to permit forming rolls 71, 72 carried on a frame 55 to be run beneath the orifice, the frame moving on a track formed by rails 56 (Figs. 1–3).

1. The frame

The frame 55 carries all parts of the apparatus, other than the means for delivering the glass, necessary to complete the forming of the articles to be made, including the motor and gearing by which the several parts are driven.

It comprises an elongated wheel base, from each side of which rises a series of standards 57 (Figs. 1–3), the corresponding standards on opposite sides being separated from each other by a gap in which the articles are formed. The upper ends of the standards on each side are connected by horizontal tie bars 58, 59 ( shown as L bars), the bars on one side being connected with those on the other by yokes 60 that are bolted to the tops of the intermediate standards 57.

The wheel base proper consists of a pair of bed members 61 and 62, which extend from end to end of the wheel base and are tied together in the vicinity of the standards 57 by a series of bolsters 63. Near the front end the wheel base supports a motor 64, and the wheel base as a whole is supported on flanged wheels 65 which run on the rails 56.

2. The ribbon forming mechanism

Figure 13:
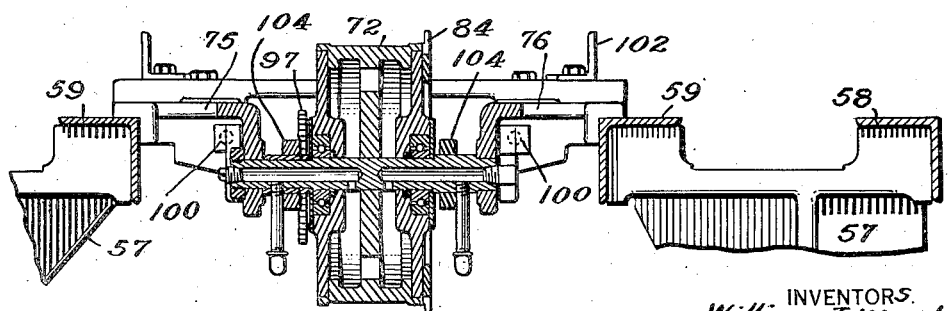
Fig. 13 is a transverse vertical section through one of the rolls on the line 13—13 of Figs. 4 and 11.
Figure 12:
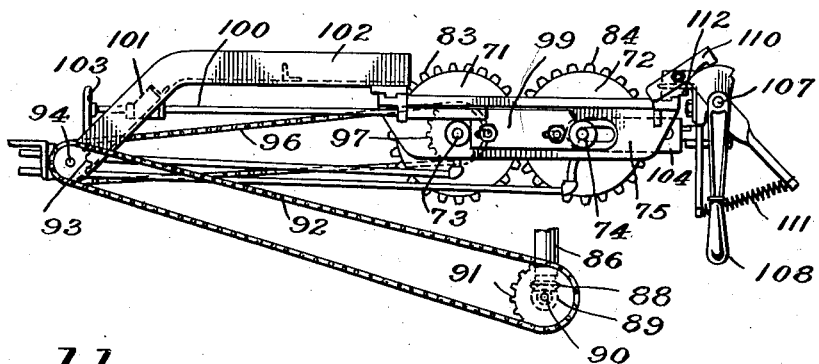
Fig. 12 is a side elevation, on an enlarged scale, of the feed rolls and drive.

Mounted in the gap of the frame 55 near the top thereof, and toward the rear end, are two water-cooled rolls 71, 72, turning respectively around shafts 73, 74, which have their opposite ends carried in brackets 75, 76 that rest on and project inwardly from the opposite angle bars 59 on top of the standards (Fig. 13). The rolls are spaced apart to create a vertical forming pass 77 between them, and through this pass the glass 78, issuing from the outlet orifice 52, passes, being in such passage reduced to the form of a ribbon 79. To make the most efficient use of the ribbon in the fabrication of the ware, one of the rolls 72' preferably has a series of pockets 80 in its periphery (Fig. 36), by which a series of bosses 81 is formed on a ribbon 79' (Figs. 42 and 43).

Figure 11:
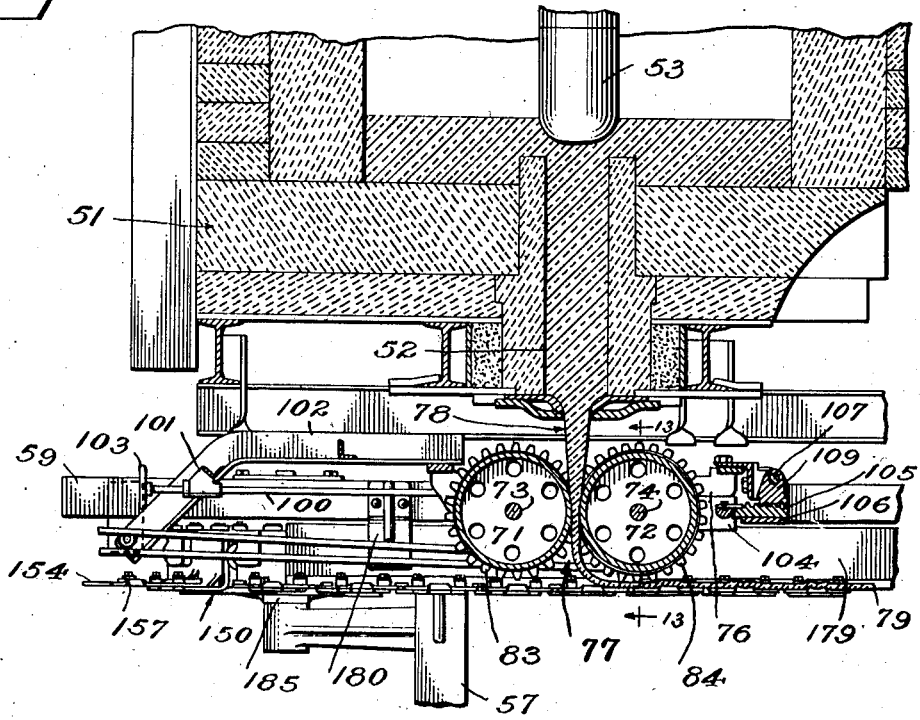
Fig. 11 is a longitudinal vertical section through the forehearth and the feed rolls on the line 11—11 of Fig. 4.
Figure 14:
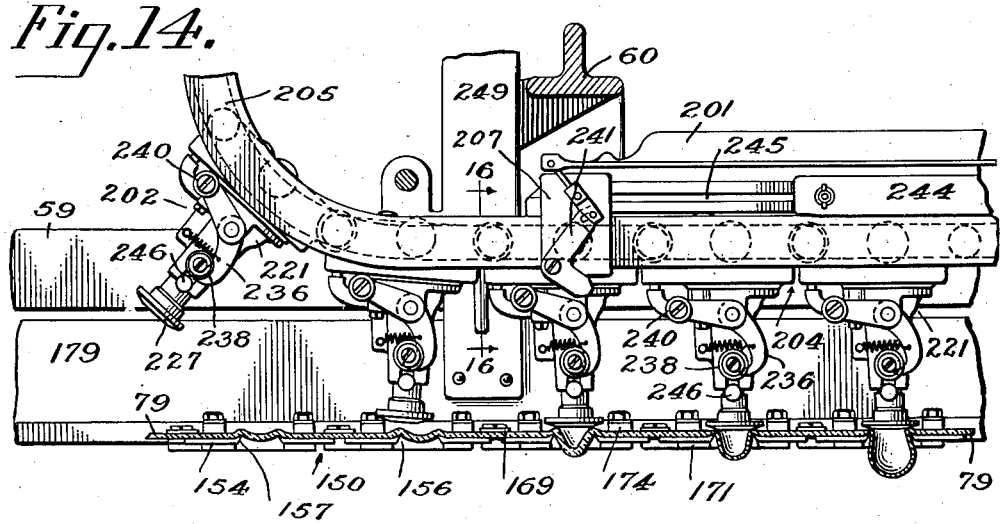
Figs. 14 and 15 are, respectively, longitudinal sectional details of the blowing mechanism as the blowheads approach and leave the ribbon.

When such pockets are used the ribbon between the bosses may be of a thickness only sufficient to form a connection between the bosses. If the pockets 80 are not employed the ribbon must be made thick enough to be worked into the articles 82 that are to be made (Figs. 11 and 14). While the rolls may be of various constructions and variously driven to accomplish the functions above stated, the following is a construction which has been found suitable in practice.

As best shown in Fig. 13, means of any approved construction are provided for circulating water through the rolls for the purpose of cooling them. If the rolls are run at a temperature sufficiently high to cause the ribbon to adhere to them, even momentarily, trouble may be met due to the formation of a skin on the ribbon by the prolonged contact of glass with metal. On the other hand, the period of contact between the glass and the rolls, when the stream is being flattened as here contemplated, is so small that the low temperature of the rolls is not critical in the normal operation of the machine.

In the construction shown in certain of Figs. 1 to 35, rolls 71 and 72 have fastened thereto inter-meshing gears 83 and 84, respectively, whereby roll 71 drives roll 72. A sprocket 85 is mounted near the top of a shaft 86, which is rotatably mounted in a bearing plate 87 and carries on its lower end a bevel gear 88 that drives a bevel gear 89 on the inner end of a stub shaft 90. The latter, through a sprocket 91, chain 92, sprocket 93, jack shaft 94, sprocket 95, and chain 96, drives a sprocket 97 affixed to roll 71, and hence drives roll 72 (Figs. 4, 8, 12 and 13).

To enable the rolls 71 and 72 to be spaced apart the desired distance, according to the ware to be made, shaft 74 of forward roll 72 is mounted in slots 98 in brackets 75 and 76 (Fig. 8). Slidably mounted in these brackets, to the rear of shaft 74, are blocks 99. Threaded in the latter are shafts 100 which are rotatably mounted in bearings 101 on trunnion arms 102, to be described hereinafter, and which have hand wheels 103 for their convenient manipulation (Figs. 8, 11, 12 and 13).

When the latter are turned in one direction they force the slidable blocks 99, and hence shaft 74, forwardly, thus producing a greater space between the rolls. To reduce this space wheels 103 are turned in the opposite direction, permitting shaft 74 to be moved rearwardly by a spring take-up, to be described later, which also has for its purpose to avoid jamming of the rolls if a hard object should attempt to pass between them.

Mounted on shaft 74 are drag links 104 (Fig. 8), whose forward ends are attached to a rack 105 that is slidably supported on a bracket 106 carried loosely on a rock shaft 107 (Fig. 11). The latter is also provided with a handle 108 (Fig. 12), and with a segmental pinion 109 for engagement with rack 105. By pulling handle 108 toward the delivery end of the machine, segmental pinion 109 will be rocked, and rack 105 will be moved in the same direction, thus separating roll 72 from roll 71 through drag links 104. When the handle has been moved far enough, it may be locked against return movement by a dog 110. To return roll 72 to its operating position, dog 110 is lifted by hand and handle 108 will be rotated back to normal by a spring 111. Roll 72 is therefore normally forced toward roll 71 by spring 111, attached to an arm fast in shaft 107, to a position determined by the adjustment of shafts 100, the strength of spring 111 being sufficient in normal operation to hold roll 72 to this adjustment, but to yield to any excessive pressure which tends to separate the rolls.

To permit the whole roll assembly to be lifted clear of the body of the machine when installing and replacing the rolls, trunnion arms 102 are tied together at their rear ends for simultaneous movement around the axis of jack shaft 94, and at their opposite ends they are attached to a tie bar 112 which connects brackets 75 and 76.

*Pocket roll unit.*—When it is desired to form a ribbon 79' with the bosses 81, as shown in Figs. 42 and 43, roll 72 is replaced by the roll 72' provided with pockets 80. This type of roll unit could be mounted and cooled in the same manner as the plain roll unit heretofore described, but I prefer to use the modified mounting, shown in Figs. 36–39, in which rolls 71' and 72' are mounted on shafts 73' and 74' that are carried in brackets 75' and 76', these brackets having leveling screws which rest on the tie bars 59. These rolls may be cooled in any desired manner.

Rolls 71' and 72' have fast thereto inter-engaging gears 83' and 84', respectively, and roll 72' is driven through a gear 97' thereon by a gear 113 on a transverse shaft 114 (Figs. 38 and 40). The latter has fast thereon a pinion 115 meshing with and driven by a gear wheel 116, sleeved on and driven by a cross shaft 90' through a differential 117. The shaft 90' is driven from a vertical shaft 118, by bevel gears 88', from an extension of the main drive shaft.

To effect a regulable spacing between the rolls 71' and 72', the axis of the latter is mounted in a fixed position, whereas shaft 73', which carries the rear roll 71', is mounted in bearing blocks 119 carried by the brackets 75' and 76' (Figs. 38 and 39). each block 119 is shifted by rods 120 secured to each end of these blocks and passing through bosses 121 carried by brackets 75' and 76'. At their rear ends the rods 120 are adjustably secured to a tie bar 122, guided in a slot 124 in the brackets 75' and 76'. The function of tie bar 122 is to transmit spacing movement to roll 71', as follows: At their rear ends brackets 75' and 76' are tied together by a yoke member 125 which has yoke arms 126 in which is sleeved an adjustment shaft 127 carried by bearings supported on tie bars 59, and having fast thereon a hand wheel 128 and a worm wheel 129. The latter is located between yoke arms 126, and meshes with a worm wheel 130 slidably keyed on an auxiliary shaft 131 which is supported in a bearing in the yoke arms. The forward end of shaft 131 is threaded through and is supported in the tie bar 122, the worm wheel 130 being contained between lugs 132 and 133 on the lower side of the yoke arms. Forward movement of shaft 131 is limited by the engagement of an adjustable collar 134 thereon with lug 132, and its movement in the opposite direction is resisted by a spring take-up to be described later. Thus the rotation of shaft 127 (unless the spring yields) causes the tie bar 122 and roll 71' connected to it to move forwardly or rearwardly according to the direction in which the hand wheel 128 is turned, effecting the desired spacing of the rolls.

To avoid jamming of the rolls in case a hard body should attempt to pass between them, there is provided a roll release mechanism for shifting roll 71' away from roll 72'. This is in general like the mechanism for separating the plain rolls but differs in its detailed construction. It operates as follows:

An angle bar 135', fast to the yoke member 125, has bearings 136 which support a rock shaft 107'. The latter carries a bifurcated arm 109', whose lower end engages tie bar 122. At one end, shaft 107' carries an operating handle 108' for its convenient manipulation, but is normally pulled in the direction to bring the rolls together by a tension spring 111' (Figs. 36 and 37). To permit the rock shaft to be held in a position to hold the rolls apart, it is provided with a suitable catch 110'. When the latter is released spring 111' normally rocks shaft 107' to move tie bar 122 sufficiently to cause collar 134 to contact with lug 132, thereby moving roll 71' toward roll 72' to a position determined by the adjustment of collar 134.

When it is desired to install or replace the rolls, the roll mechanism can be swung on shaft 127, but to permit removal of the entire roll mechanism when desired, the bearings for shaft 127 are each made in two parts, an upper part 137 and a lower part 138. The latter is bolted to tie bar 59 and has a projecting hinge pin 139 which supports the outer end of bearing part 137. These parts are normally bolted together for action as a restraining member, but when it is desired to remove the entire roll mechanism the bolts are removed, the parts 137 are swung backwardly on hinge pins 139, and the roll mechanism may then be lifted clear of the machine.

When using the form of the invention which embodies the pocket rolls it is essential that the bosses 81 formed on the ribbon 79' register with the apertures in the ribbon conveyor 150', and this is effected by a differential 117 of any suitable type, its purpose being to angularly displace the gear 116 on the shaft 90' the desired extent, and to thereby adjust the phase of rotation of the roll 72' with that of the conveyor, and to lock it in such adjusted position.

3. Ribbon conveyor

Figure 3A:
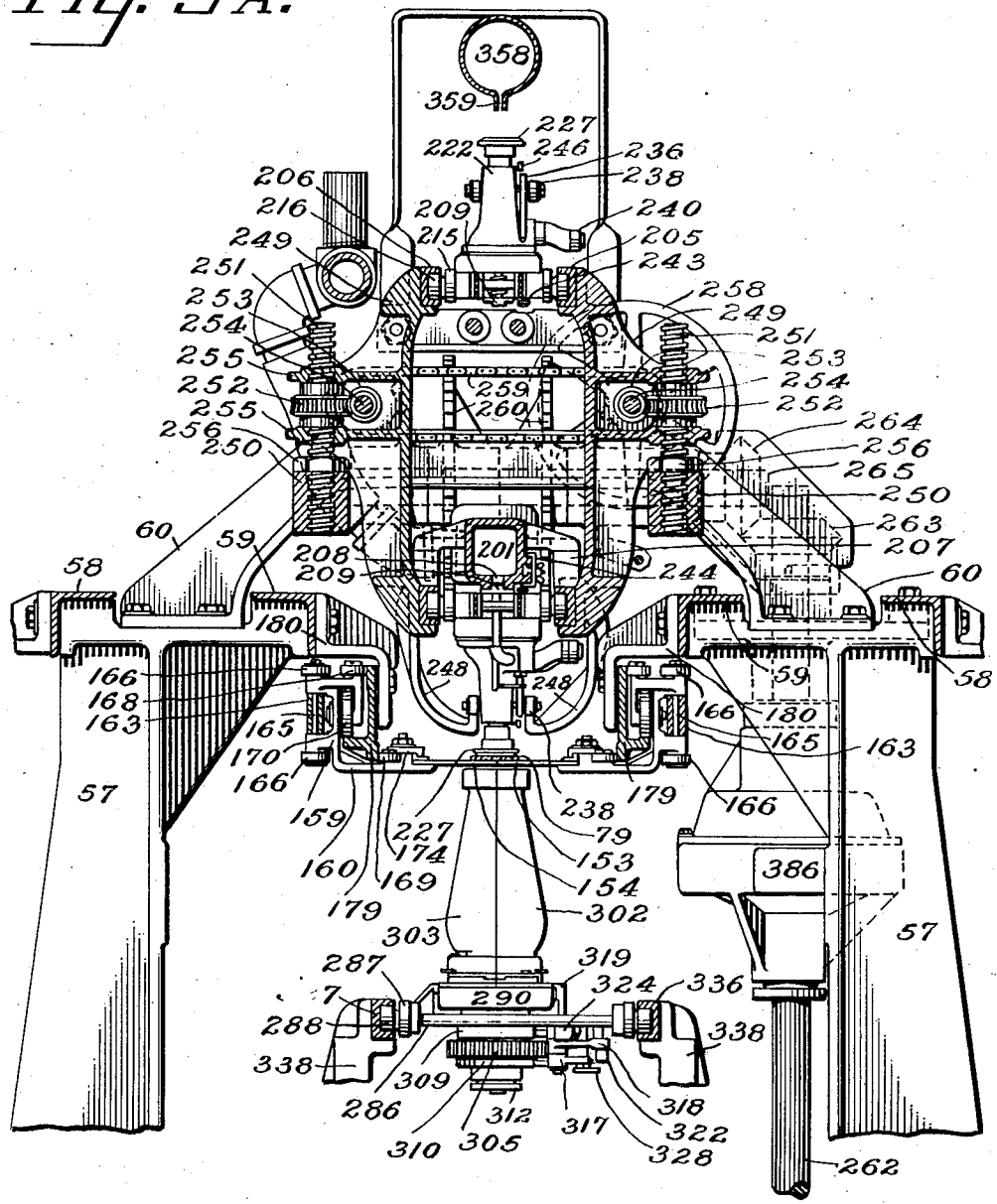
Fig. 3A is a similar view, on an enlarged scale, on line 3A—3A of Fig. 1, but also showing the means for effecting simultaneous adjustment of the blowhead system.

In the gap between the standards 57 is the working run of the ribbon conveyor 150 which passes below the forming pass 77 of the rolls 71, 72 and receives the ribbon 79 formed thereby (Figs. 3, 4 and 9). This conveyor, in the form shown in certain of Figs. 1 to 35, is composed of two similar belts 151, 152, each consisting of a number of horizontal plate sections 153 or 154, articulated together on vertical pivots and moving as a whole in a substantially horizontal plane. As shown in Figs. 3, 3A, 4 and 9, each complete plate 155 of the conveyor consists of the plates 153, 154, which in the working run abut against each other on the central longitudinal plane of the machine, so that notches formed in their abutting edges form orifices 156. Around the periphery of each orifice 156 there is a struck-up portion 157 (Fig. 11).

Each plate section 153, 154 is attached to a link 158 (Figs. 6 and 7) which is preferably a casting consisting of a main vertical portion 159 and a main horizontal portion 160, the latter extending at right angles to one side from the bottom of the former. It also has a top horizontal web 161 which projects on the other side of the main vertical portion 159, the vertical portion having a housing 162 above the horizontal portion 160. At one end of the vertical portion of each link there is a projecting tongue 163 and at the opposite end there is a bifurcated knuckle 164 to receive the tongue 163 on an adjacent link, that is secured thereto by a hinge pin 165 (Fig. 3A). On each end of each hinge pin there is mounted a drive roller 166. Each link has also mounted thereon, on vertical pivots, a drive roller 167 and two guide rollers 168 and 169, the roller 168 being near the top of the vertical portion 159, and the roller 169 being near the free edge of the horizontal portion 160, and on a horizontal pivot a support roller 170. The free end of the horizontal portion 160 is provided with two outwardly extending fingers 171, and in alignment therewith are corresponding lugs 172. The top portion of each lug is tapered downwardly and inwardly to provide a wedge-shaped seat 173 for cooperation with a correspondingly tapered hold-down block 174, the outer end of which has a downwardly extending lug 175 (Fig. 5). The hold-down blocks are bolted to the wedge-shaped lugs to secure the plates 153, 154 to the links 158. The combination of the wedge-shaped portions and the downward extension locks the plates to the links by engaging an upstanding lug 176 at the rear of each plate 153, 154, thus forcing the latter downwardly and inwardly due to the wedge construction. The bolt holes through the hold-down blocks are of larger diameter than the bolts used therewith to allow for this take-up action.

Each belt is carried on L-shaped orifice rails 178, 179 (Figs. 3, 3A and 5), carried from the tie bars 58, 59 by brackets 180, the rails 179 being mounted in the gap between the standards, and the rails 178 being mounted on the outer side of said standards. The rails 178 and 179, one each side of the central axis of the machine, are reversely placed and terminate short of the ends of the main frame. The rollers 170 of the conveyor sections run on the horizontal portions of the orifice rails, and the rollers 168 and 169 on opposite sides of vertical webs thereof, the former near the top and the latter near the bottom.

Belts 151 and 152 are each driven by orifice drive sprockets 181, 182 (Figs. 9 and 10) on vertical shafts 183 and 184, and engage drive rolls 166 and 167.

At each end of the orifice rails the belts 151, 152 are guided by sprockets 185, 186, respectively (Figs. 4, 5 and 9), each of which has two sets of teeth arranged one directly above the other, and preferably integral. The upper teeth on each sprocket engage the upper row of drive rollers 166, and the lower teeth engage the lower row of drive rollers 166. Guide sprockets 185, 186 are mounted on stub shafts 187 and 188, and each has a supporting plate 189 on its bottom face to prevent the links from sagging as they ride off from the orifice rails 179, which terminate about the center line of the guide sprockets at each end of the machine.

In addition to the orifice drive sprockets and the guide sprockets there is also provided a pair of orifice idler sprockets 85 (Fig. 4), to equalize the motion on both runs of the belts. Each of these meshes on its opposite sides with the two runs of the belt with which it is associated.

In the modified construction shown in Figs. 36–47, in which integral plates are used, there is only one belt 152', hence one set of sprockets 181, 185, and 85 is omitted. The drive sprocket, guide sprockets, and idler sprocket which are used are designated by the reference characters 182', 186' and 85', respectively (Figs. 36 and 45). In this modified construction the plates 155' are provided with orifices 156' but these orifices do not have a struck-up portion around their periphery as was the case with the orifices 156. At its inner end each plate 155' has a lug 176', in which is secured a horizontal hinge pivot 194. While this lug could be made integral with plate 155', it is preferred to form these parts separately and to screw the lug to the plate.

It is preferred to mount this type of plate on links 158' (Figs. 44 and 45) which are of slightly different construction from the links 158. The plates in this form are horizontally pivoted as at 172' to the horizontal portion 160' of the link and are thus free to swing downwardly on their pivots on the outer run, being allowed to gradually drop into vertical position, at the delivery end of the machine, by a drop cam 196 (Fig. 44), and being elevated into horizontal position again, just before they reach the feed end, and by a corresponding lift cam 197 (Fig. 36). On the operative run the outer ends of plates 155' are supported by a rail 198 (Figs. 44 and 45).

It will be noted that the conveyor is driven by sprockets engaging a plurality of drive points (end and medial) on each link on a rectilinear run of the conveyor and that the idler sprockets also engage these plurality of points on links on opposite rectilinear runs, thus providing for the desired uniform velocity of the conveyor. On the other hand, the guide sprockets merely guide drive points at the axis of articulation of the links.

*4. Blowing mechanism*

Located above a portion of the operative run of the conveyor 150 is the blowing mechanism, comprising a fixed reservoir of blowing air in the form of a blowbox 201 (Figs. 14, 15 and 19) and a series of movable blowhead mechanisms 202 cooperating therewith and with the ribbon conveyor. The blowbox 201, which is long in comparison with its width and depth, is located at the top of the gap between standards 57, and extends forwardly from a point adjacent to the point where the ribbon 79 contacts with the conveyor.

Between the conveyor and the blowbox passes the blowhead assembly, mounted on a series of links 203, articulated in the form of a belt 204 running on a pair of continuous rails 205, 206, arranged in vertical planes with an operative run below the box 201 and above the conveyor 150 and a return run above the box, with return bends beyond the ends of the box.

Illustrated herein are two types of blowing mechanism which, for convenience, will be designated as the valve (Figs. 3, 3A and 14–20) and the valveless type (Figs. 42 and 43). While the valve type has been illustrated in certain of Figs. 1–35, and the valveless type in connection with the form shown in Figs. 36–47, it will be obvious that either type of blowing mechanism may be used with either form.

Considering first the valve type, and referring particularly to Figs. 3 and 14-20, it will be seen that the blowbox 201 is supported by brackets 207 carried by the lower portions of rails 205, 206, the latter being carried by yokes 60 mounted on top of certain of the standards 57.

The bottom of the blowbox 201 is slotted, as at 208, (Figs. 3, 16 and 19) on the central longitudinal plane of the machine. The lower surface of the box is channelled, as at 210, in alignment with the slot. The channel and slot receive central ribs on the upper face of slide shoes 209 which constitute part of the blowhead belt 204, the shoe on each side of the rib making contact with the lower surface of the box on the sides of the slot. The top of the rib, as its shoe moves into the slot, contacts with the base of the channel and prevents escape of air therethrough. For structural reasons the two walls of the slot may be connected, as shown, by transverse webs 211, but the top of the rib should not contact with these, as a chamber containing air at blowbox pressure should be located at all times above the tops of the ribs, escape therefrom being prevented by the shoes.

Figures 18, 19, 20:
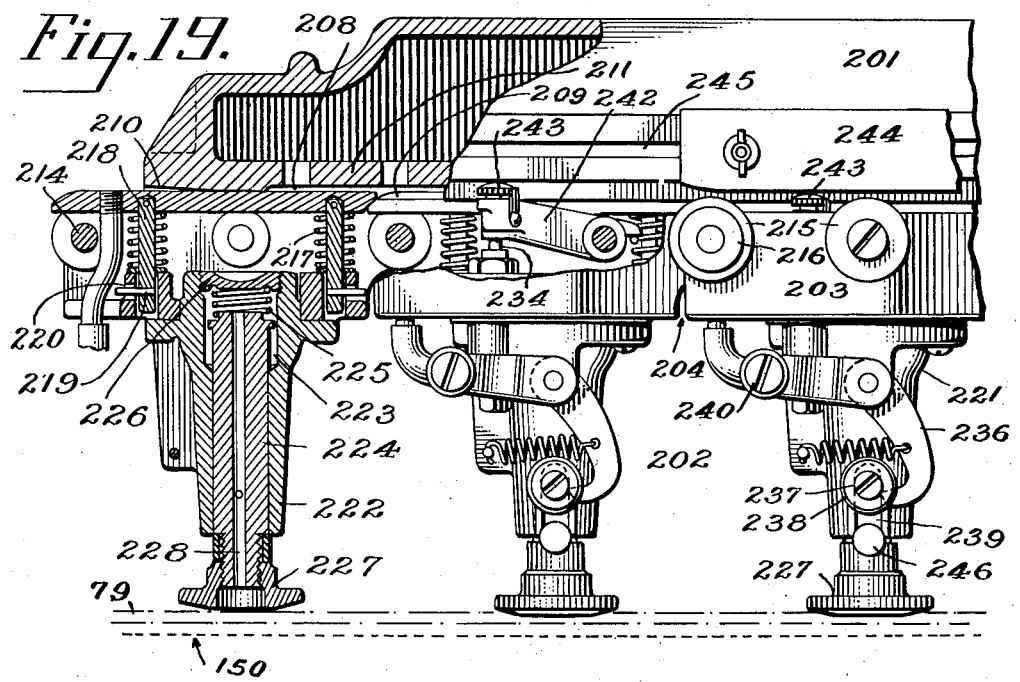
Fig. 18 is a plan view of a blowhead unit.
Fig. 19 is a longitudinal view, partly in section, showing the relative positions of the blowhead units, blowbox, and puff cam.
Fig. 20 is a 45° vertical section through a blowhead valve and spindle on the line 20—20 of Fig. 18.

The blowhead mechanisms 202 are alike, the terms top and bottom having reference to the position such mechanism occupies when below the blowbox 201 and in the operative run of the belt 204. Each section of the latter is formed by one of the links 203 (Fig. 18). These links are U-shaped in vertical cross section and at each corner each link has a bearing 212 or 213 to receive a pin 214 by which it is connected to the adjacent link, the bearings at one end being closer together than at the other to permit narrow bearings 212 on one link to slip between wider bearings 213 on the adjacent link. A drive roller 215 is mounted on connecting pin 214 adjacent to the outer surface of each of the wide bearings 213, and on the outer side of each drive roller 215 is mounted a supporting roller 216. An additional drive roller 215 is rotatably mounted on either side of link 203 mid-way of its length but in longitudinal alignment with the first drive roller 215.

Carried on guide pins between the side webs of each of the links is the shoe 209 having a longitudinal rib on the upper surface thereof adapted to be received within the blowbox slot 208. The shoes are pressed upwardly against the bottom of the box, to make a tight contact therewith, by springs 217 which are mounted on guide pins 218, which are secured to the undersides of the shoes, the lower ends of the pins being slidably keyed to the bottom webs of the links 203 by retaining pins 219 that engage recesses 220 in such webs. When a plurality of blowhead mechanisms are on a straight run the shoe of each one abuts upon and makes close contact with the shoes upon adjacent links. Thus a series of shoes below the slot 208 completely closes the latter except for exit of blowing air as will be hereinafter referred to.

The individual blowhead mechanisms 202 each consist of a body 221 which, in the form shown in certain of Figs. 1-35, consists of a housing 222 screwed into the bottom of the link 203 at the upper end and provided with an axial bore 223 that is enlarged at its upper end (Figs. 19 and 20). In the bore there is mounted a shouldered blowhead spindle 224 which forms a tight but sliding fit in the lower portion of the bore. A spring 225, whose upper end bears against a plug 226 that is screwed into the upper end of bore 223, normally pushes the shoulder of the spindle into contact with the lower end of the enlarged portion of the bore. At its lower end blowhead spindle 224 is threaded to receive a blowhead 227. As best shown in Fig. 19, the spindle 224 and blowhead are provided with an axial central bore 228 for the passage of the blowing air. As best shown in Figs. 14 and 19, the blowhead 227 has a flat bottom for cooperation with the orifices 156 in orifice plates 155, its edges being chamfered. The blowhead spindle 224 is also provided with a vent from the bore 228 through a side wall.

The housing 222 has an offset lug 229 (Fig. 20) containing upper and lower chambers 230, 231 that are separated by a perforated web 232 to provide a seat for a spring pressed ball valve 233, adapted to be unseated by a pin 234. The upper chamber 230 is connected with the enlarged part of bore 223 by a port 235, and the lower chamber is connected by a flexible pipe with a port in the contact surface of shoe 209.

Figure 17:
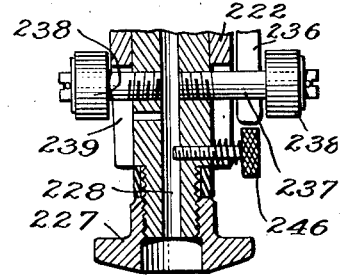
Fig. 17 is a transverse vertical section on the line 17—17 of Fig. 15, showing the lower end of a blowhead unit on an enlarged scale.

Except during the operative run of the blowhead mechanisms, each spindle 224 is held in retracted position by a latch 236 pivoted to the blowhead housing 222, said latch being spring held in engagement with one of a pair of studs 237 which are tapped into the lower portion of the spindle (Figs. 17 and 19). Each stud carries a roll 238, for a purpose to be described later, and extends through slots 239 in housing 222. The upper end of latch 236 carries a roll 240 for sliding engagement with a trip release 241 that is pivoted to one of the brackets 207 (Fig. 14). The trip release may be thrown out of operative position when desired.

When latch 236 releases the spindle spring 225 forces blowhead 227 downwardly on the glass ribbon 79. Blowing air is not allowed to enter the blowhead spindle, however, until valve 233 is opened by its pin 234 being depressed by an air valve arm 242, which is pivoted in the link 203. Arm 242 is provided with an adjustable screw 243 that, in the travel of a blowing unit, is depressed by a puff cam 244 which is longitudinally adjustable in a T-shaped guide slot 245 in blowbox 201. The air from channel 208 may then pass (Fig. 20) to the blowhead and act on the ribbon 79 above one of the orifices 156 to give the initial puff or puffs, and this will continue until screw 243 rides off from puff cam 244.

The blowbox 201 may be divided into any desired number of compartments, containing air at different pressures, by paper gaskets (not shown), but in practice it has been found that air of two different pressures is satisfactory, one of said pressures being used for the puff and the other for the blow. The latter is controlled in time by a blow cam 247 (Figs. 1 and 2), adjustably mounted in a continuation of slot 245, and actuating screw 243.

As an additional means of regulating the air passing to the ribbon, a set screw 246 (Fig. 17) is tapped into the lower portion of the blowhead spindle 224 in line with the slots 239 in housing 222 and projecting into the bore of the spindle. By adjusting this set screw in and out a very close regulation of the blowing air may be obtained.

Figure 15:
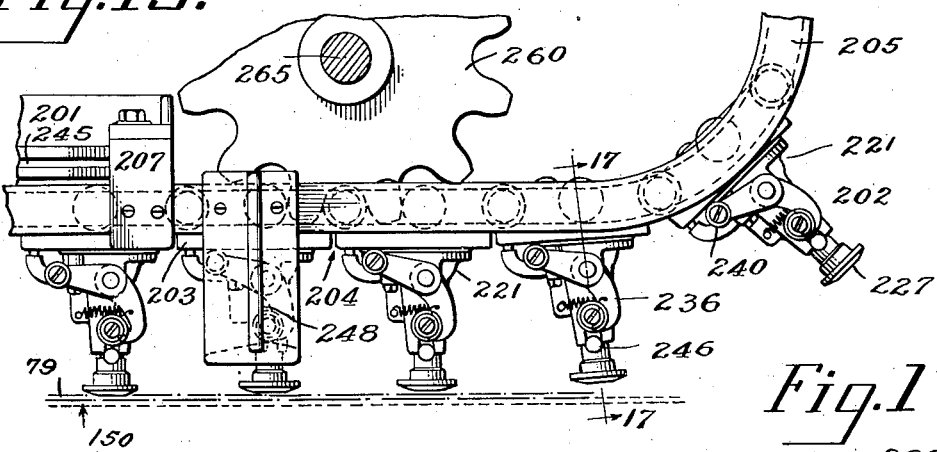
Figure 16:
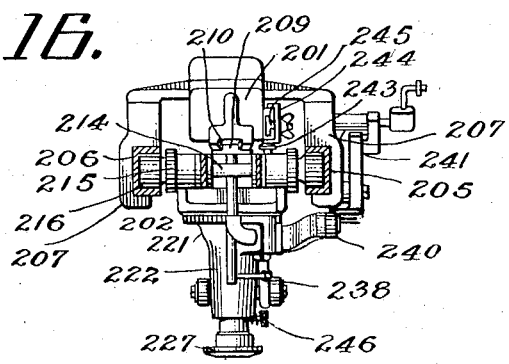
Fig. 16 is a transverse vertical section on the line 16—16 of Fig. 14, showing a blowhead unit as it enters the blowbox.

When the blowheads reach the vicinity of the end of the rails 205, 206 at the delivery end of the machine, the rolls 238 ride upwardly on a lift cam 248, supported by the rails, and the corresponding spring latch 236 then snaps under stud 237, thus holding blowhead spindles 224 in retracted position (Fig. 15).

The belt formed by the articulated blowhead mechanisms 202, is guided on the rails 205, 206, by the supporting rollers 216, which run in the U channels in the rails.

The rails 205, 206 are each supported by a series of blowhead supporting rail brackets 249 which are supported for vertical adjustment by the yokes 60. For this purpose each of these yokes 60 is provided with a pair of bosses 250, internally threaded to receive threaded supporting studs 251. On each of the latter is mounted an internally threaded worm wheel 252 for engagement with a corresponding worm 253 on a horizontal adjusting shaft 254 that is carried by the corresponding blowhead supporting rail bracket 249. The latter each have yoke fingers 255 to form guide bearings for the vertical travel of the supporting brackets in respect thereto on the supporting studs 251. Each of the latter has a lock nut 256 to prevent its turning in boss 250 when the blowhead supporting rail bracket 249 is being adjusted vertically by the shaft 254. To permit simultaneous vertical adjustment of the brackets 249 on the same side of the machine the several aligned shafts 254 are connected by couplings 257 and are provided with operating handwheels 258. The aligned shafts 254 on the two sides of the machine are geared together by a sprocket chain 259 (Fig. 3A) so that the rails for the blowheads can be raised or lowered together by turning the shaft on one side by the wheels 258.

To drive belt 204 on rails 205, 206, the links on the bottom run are caused to engage drive sprockets 260 toward the delivery end. Tandem idler sprockets 261 are provided toward the feed end of the machine to equalize the motion on both runs. Drive sprockets 260 are driven through a vertical blowhead drive shaft 262 on whose upper end is mounted a bevel gear 263 that meshes with a bevel gear 264 on a gear shaft 265 which is mounted in a bracket 249 and carries drive sprockets 260.

In the valveless type of blowhead construction shown in Figs. 42 and 43, the parts will be designated by primed numerals corresponding to the unprimed numerals which designate the corresponding parts of the type of blowhead construction just described. In the valveless type the blowhead body 221' is attached to links 203', similar to links 203, and contains within its axial bore 223' a sliding hollow spindle 224', the bore being enlarged at its upper end (Fig. 42). Downward movement of the spindle 224' is resisted by a coiled spring 225' interposed between the bottom of the enlarged portion of bore 223' and a shoulder 268 on the upper portion of the spindle. The latter carries an internally sliding plunger member 269 which is pressed downwardly, during the operative run of the blowhead mechanisms, by a spring 270 interposed between its upper end and the head of the cavity in the spindle 224' in which it operates. To limit its downward travel, the lower end of the plunger member 269 is reduced and extends through a stop nut 271 which is threaded on the bottom of spindle 224'. The extreme lower end of the plunger 224' carries a conical blowhead 227' to contact with the glass ribbon 79'. The shoes 209' are pivoted at 272 to the top of the blowhead spindle 224', and a rubber packing 273 is interposed between them, but any other system of connection between the spindle and the shoe, which permits the shoe to align itself and still maintain a seal with the spindle, might be used. Blowhead spindles 224' are not provided with air vents, such as the vents previously described, and they have no latches to hold them up for a portion of their operative run, this in the present type being due to the springs 225' which normally hold the spindles and parts carried thereby in an elevated position. To overcome this upward pressure and seat the blowheads 227' in the ribbon 79' during the major part of their travel below the blowbox 201', the forward end of the latter has a cam 274 (Fig. 42) which depresses shoes 209' as they approach the blowbox (and thus, through the springs 270, the blowheads) and holds them depressed until the end of the blowbox is reached, at which point there is provided a release cam 275 (Fig. 43) that gradually allows the springs 225' to return the blowheads and shoes to their normally elevated position.

Blowing air is supplied to this type of blowhead mechanism by a modified type of blowbox 201' (Fig. 42) which has no slot corresponding to the slot 208 previously described, but whose bottom consists of a plate 276 provided with a plurality of air ports 211' which may be partially or completely closed by a corresponding series of adjusting screws 277 threaded through the top of the blowbox 201'.

The shoes 209' are held against the under side of the plate 276, and each shoe has a port connected with the interior of the corresponding spindle and adapted in travel of the shoe to successively register with the ports 211', and thus admit air to the plunger 269. In this type the shoes do not make tight contact with shoes on adjacent sides thereof.

It will be noted that each of the types of blowing mechanisms before described comprises a blowbox, combined with a series of articulated sections relatively movable in respect to each other, each section carrying by a resilient mounting a blowing head and a shoe with means actuated on the travel of the shoes beneath the blowbox to resiliently press the heads upon the ribbon of glass, air ports being placed in the shoes to cooperate with the box and to permit the passage of air to the blowheads. In each of these constructions, moreover, throttling valves are interposed in the air passages to the blowheads. In each of them the blowheads, when lowered on the ribbon, serve to anchor the glass on the conveyor. This is especially desirable when a bossed ribbon is used as it assures the maintenance of the bosses over the apertures, even if the ribbon between the bosses should be subsequently severed. In the valveless type these throttling valves are individualized in respect to the several ports in the air box so that the amount of air fed to the spindles in successive positions along the working path may be determined and graduated to obtain the best results.

It should be further noted that, due to the short length of air passages between the blowbox and the blowheads, reduction of pressure in such passages is reduced to a minimum, and that in the valveless type these passages are straight from the throttled air ports from the box to the blowheads. This permits satisfactory blowing of articles with a very low pressure in the blowbox, and an accurate control of air pressures at the blowheads by the throttling valves.

5. Mold mechanism

The molds 280 are mounted on a mold belt 281 which consists of a series of identical articulated mold carrier links 282 and moves in a closed path in a vertical plane in the gap between the standards 57, its operative run being the upper one and being beneath the conveyor 150. As the machine here described is one constructed for the manufacture of bulbs 82 for electric lamps, the molds 280 are separable and of the paste mold type and, during the blowing, are rotated around the vertical axis of the mold cavity. This necessitates special mechanism for closing the molds, their rotation during the blowing period, and the arrest of their rotation and opening when they are in a position such that the finished bulbs 82 may be removed from the molds, without injury, by the travel of the glass conveyor. Moreover, in order to reduce the amount of glass formed into the ribbon and not fabricated into the final product, it is important that the adjacent molds be brought as close together as possible. This renders a compact mold mechanism of great importance. A construction which has been found suitable is as follows:

Each of the mold links 282 (Fig. 31) comprises a plate member 283, having at each corner a bearing 284, 285, the bearings at one end being closer together than at the other to permit narrow bearings 284 on one member to slip between wider bearings 285 on an adjacent member, the members being secured together by pins 286 which carry, outside of the bearings, driving rollers 287, and outside of these supporting rollers 288.

Generally speaking, the mold opening, closing and rotating devices involve the mounting of a mold on a rotatable member which has sleeved therein a mold opening and closing shaft, independent uni-directional friction drives from a part actuated on the travel of the mold to the shaft and to the mold carrier, and means for locking either the shaft or the mold carrier against rotation by its friction drive or the release of such for rotation by such drive. When one of the parts is rotated in respect to the other the direction of the relative movement of the two parts will be different from that which results from the rotation of the second part in respect to the first, and this difference of rotation is utilized to cause the reciprocating movement of the mold parts to effect opening and closing.

Rotatably supported in the body portion of the link, by a bearing 289 (Figs. 23 and 24), is the mold carrier body 290, the lower portion of which is stepped, at 291 and 292, and the upper portion of which is recessed. Within body 290 is sleeved a shaft 293, the shaft having fast on its upper end a drive gear 294, which drives two oppositely disposed pinions 295 on pins 296 in the bottom of the recess in the body. The pinions 295 have fast thereon gears 297, each of which meshes with a sliding rack 298, these racks being placed back to back and being guided in their movement by slots in the top of the mold carrier body. Each rack 298 has a lug 299 on which is secured a mold segment 300 that has a pair of mold lock studs 301 to receive the individual mold sections 302 and 303, a slotted cover plate 304 being interposed between the mold segments and the top of the mold carrier, and being fast to the latter. Sleeved on shaft 293, below the lower end of the mold carrier body, is a mold rotating gear 305 which cooperates with a mold carrier rotating rack 306 carried by mold-supporting rail brackets which will be described later. The rack 306 has pivoted to it, on its approach end, a pick-up rack 307 (Fig. 26), which is normally pressed into the path of the gears 305 by a spring 308.

As shown in Figs. 22, 23 and 24, the lower end of each mold carrier body 290 has fast thereon a ratchet disc 309, located above the gear 305, and the shaft 293 has keyed thereon a ratchet disc 310 located below the gear 305, a friction drive disc 311 being interposed between the gear 305 and the disc 309 and between the gear and the disc 310, so that the shaft or the mold carrier, or both, can be rotated around their common axis by the rotation of gear 305, dependent on their locked or unlocked condition. In order to place pressure on the friction discs a collar 312 is fast on the shaft below the ratchet disc 310, to which it is locked by a pin 313, springs 314 being interposed between the two to press the disc upwardly on the shaft.

The operation of opening and closing the molds is dependent upon a relative rotation of the shaft 293 and the mold carrier body 290 under the drive of gear 305, which rotation in turn is dependent on the condition of certain locks shown particularly in Figs. 25–30.

Mounted on a pin 315, projecting from the lower surface of the link body 283, is an upper pawl arm 316 to lock the disc 309 which is fast on the mold carrier body 290, a lower pawl arm 317 to lock the disc 310 which is keyed to the shaft 293, and a cam arm 318 intermediate of the pawl arms and acting as a common drive, with a loose connection, for the two arms.

The normal position of the parts is one in which the mold halves are open to their maximum and the mold carrier body is in such angular position in the link body that the mold halves are on opposite sides of the plane in which the mold carrier moves, the mold carrier body being held in this position against the frictional drive exerted from the gear 305 by the ends of the mold actuating racks 298 contacting with lugs 319 upon the top of the link body 283 (Fig. 31). At this time the molds are held open because rotation of their actuating gear 294 is prevented by the engagement of a bit 320 carried by the lower pawl arm 317 with a ratchet insert 321 in the lower ratchet disc 310. If, during this position of the parts, the gear 305 is in engagement with the rack 306, the friction drives will slip.

On its outer end cam arm 318 carries a roller 322 by which the arm is rocked when the roller, in the travel of the individual mold mechanism contacts with a mold closing cam 323, which is adjustable longitudinally of the machine. With the parts in the normal position shown in Fig. 25, it will be seen that movement of arm 318 rocks, through a compression spring 324, the upper pawl arm 316, and a bit 325 carried by it moves into engagement with a ratchet insert 326 carried by the plate ratchet disc 309, thus placing the parts in the position shown in Fig. 26, in which the mold carrier body, in addition to the lock against rotation due to the lugs 319, is also locked by the upper pawl arm 316.

As roller 322 rides further onto cam 323, the further rocking of cam arm 318 causes a lug 327 carried thereby to strike the lower pawl arm 317 and rock it until its bit 320 disengages the lower ratchet disc 310 as shown in Fig. 27, the pawl arm being caught in the disengaging position by a spring-controlled latch 328.

During the time required for the transition from the position shown in Fig. 26 to that shown in Fig. 27 the mold rotating gear 305 starts the rotation of pinion ratchet disc 310, thus sliding the racks 298 to start closing mold sections 302 and 303, and breaks the lock at lugs 319. As roller 322 continues to ride on the straight portion of cam 323 the closing of the molds will be completed.

When the roller 322 runs off cam 323 it is returned to its normal position by a spring 329 (Fig. 22) and, by the engagement of a lug 330 on its carrying arm 318 with a lug 331 on the upper pawl arm 316 (Fig. 23), rocks the latter against a stop 332 to disengage it from the ratchet disc 309 (Fig. 28).

As both locks against rotation of the mold carrier body are now broken, the mold 280 is rotated, by the continued engagement of gear 305 with rack 306, the gear 294 rotating with the mold carrier body. This continues for a suitable period until the mold reaches a predetermined point in its travel, when the latch 328 strikes a mold opening cam 333 (Figs. 2 and 29), adjustably mounted adjacent to the path of the mechanism, and is moved to release the lower pawl arm 317, thus allowing the latter to be rocked by its spring 335 (Fig. 22) to its normal position of engagement with pinion ratchet disc 310, as shown in Fig. 30. This locks pinion ratchet disc 310 but, as plate ratchet 309 is still unlocked, the mold carrier body is now rotated in respect to gear 294. This causes a rotative movement, the reverse of their prior relative movements when the mold carrier body 290 was locked and the shaft 293 free, and the consequent opening of the mold sections 302 and 303, and the movement of the racks outwardly sufficient to enable their ends to contact with lugs 319 on link body member 283, at which time the parts will again be in normal position.

The inserts 326 and 321 are preferably, as shown, duplicated on the ratchet discs 309 and 310 at diametrically opposite points to reduce unnecessary rotation of the parts.

The mold belt 281, formed by the links 282, is guided by a pair of rails 336 and 337 (Figs. 3 and 3A) preferably U-shaped with the openings facing each other to receive the supporting rolls 288 on the links 282. The upper and lower rails 336 and 337 on each side of the machine are connected together and carried by a series of carrier frames 338, each of which is guided and is adjustable vertically in respect to a series of yokes 339, the adjustment between these being effected by vertically threaded standards 340 on the members 339. The latter have their corresponding ends connected by sliding frames 341 mounted on brackets 342, on standards 57, the frames being shiftable longitudinally of the machine. To effect this, each of the sliding frames 341 has on its upper surface a rack 343 (Figs. 2 and 3) with which meshes a pinion 344 on a shaft 345 provided with a suitable handwheel 346. The entire mold mechanism may be simultaneously adjusted vertically by providing therefor a construction similar to that heretofore described in connection with the vertical adjustment of the blowhead system.

A pair of drive sprockets 347 (Figs. 2 and 9), mounted on a shaft 348 supported in suitable bearings in the mold carrier rail frames 338, and hence within the end of the path of the mold belt 281 at the front of the machine, engage the several drive rolls 287 on the mold belt to drive them. As shown, a pair of idler sprockets 351 (Fig. 1) is interposed in the rear end of the closed path of the mold belt, their teeth at top and bottom engaging the drive rollers on the upper and lower runs of the belt. Shaft 348 is driven by a mold carrier drive shaft 349, through bevel gears 350, as explained later.

6. Auxiliary features

For the most successful operation of the machine it has been found desirable to provide it with certain auxiliary features, such as a stripper mechanism, a cullet conveyor, a crack-off mechanism, a ware conveyor, and cooling means, which will now be described.

*Stripper mechanism.*—To separate the ribbon 79' from the plates 155' there is provided a stripper mechanism (Figs. 44 and 45), which consists of a disc 352 mounted on the main frame near the delivery end at such an angle and level with respect to the path of the plates 155' that the disc 352 makes contact therewith and is frictionally driven thereby in a plane at an angle to the surface of the conveyor. It edges its way between the ribbon 79' and the plates 155', thus lifting the former from the latter, at the point at which it is located, and separating the former from the blown articles, which are left hanging from the orifice 156' as shown in Fig. 45. This is possible because the blowheads 227', as best shown in Fig. 42, are wedge-shaped, their lower portion being smaller in diameter than the orifices 156' with which they cooperate. Inasmuch as the orifices 156' have sharp upper edges and flaring sides, the glass is reduced to a very thin layer between the side of the blowhead and the top of the orifice 156'.

*Cullet conveyor.*—The portion of the ribbon from which the articles have been separated continues to travel with conveyor 150 or 150' until the latter reaches the end of its straight run. At this point, in the form of my invention shown in Fig. 2, the sections of the plates 155 separate, and pass around the guide sprockets 185, 186 for their outer run, thus being moved out of the path of the remaining portion of the ribbon 79. In the form shown in Fig. 44, the plates 155' begin to drop by gravity, but a sudden drop is prevented by the cam 196, and as the plates 155' gradually drop into vertical position they pass around the guide sprockets 186' for their outer run, thus being moved out of the path of the remaining portion of the ribbon. This remaining portion of the ribbon, in both forms of my invention, drops onto a suitable cullet conveyor 353 (Figs. 2 and 44).

*Crack-off mechanism.*—After the operation of the stripper mechanism, in the form of my invention shown in Figs. 44 and 45, the finished articles 82, hanging from the plates 155', successively strike a crack-off bar 354 which is interposed in their path a short distance beyond the stripper disc 352. Inasmuch as the articles are merely hanging in the orifices 156', their contact with the crack-off bar 354 dislodges them and they fall onto a suitable ware conveyor 355.

As shown in Fig. 14, the orifices 156 in the plates 155 have struck-up portions 157, below which the sides of the orifices flare outwardly. When using this form it is unnecessary to use the stripper mechanism as the crack-off operation, which is performed by a crack-off bar 354, actually severs the finished articles 82 from the ribbon 79, due to the fact that the blowheads in seating on the glass above the struck-up portions reduce the thickness of the glass.

*Cooling means.*—To facilitate cooling of the blowheads 227, 227', cooling air is blown thereon from a blowhead cooling duct 358 (Figs. 1, 2 and 3) during their inoperative run, through a continuous slot 359 formed in the bottom of the duct.

The molds 280 and orifice plates 155 and 155' are cooled by jets of water and air (not shown) sprayed thereon during their inoperative run.

7. Driving, adjusting and synchronizing mechanism

Power for driving several parts of the machine is supplied from a variable speed motor 64 (Figs. 2 and 10), which is mounted in the main frame 55 and drives, through a worm gear speed reducer 370, the main drive shaft 371, which has fast thereon a bevel gear 372, which, through a corresponding bevel gear 373 on the lower end of the drive shaft 184 of the orifice drive sprocket 182, drives the belt 152 or 152' of the conveyor. The shaft 183 of the orifice drive sprocket 181, which drives belt 151 of conveyor 150, is driven from the main drive shaft 371 through bevel gears 374, a power jack shaft 375, bevel gears 376, an auxiliary drive shaft 377, and bevel gears 378 (Figs. 9 and 10).

Auxiliary shaft 377 also drives the blowing mechanism drive shaft 262 through bevel gears 379 and 380, and thus the blowhead belt 204.

The main drive shaft 371, by means of a mold carrier spline shaft 381, which is in effect a continuation thereof, drives the mold carrier drive shaft 349 through bevel gears 383 and 384, and thus the mold belt 281.

It has been found desirable to introduce speed reductions at certain points (Figs. 2 and 3) in the drive mechanism in order to avoid unsteady motion due to torsional spring in the drive shafts. These reductions are accomplished by speed reducing planetaries 385 interposed in the shafts 183 and 184, and a blowhead speed reducing planetary 386 introduced in shaft 263, these planetaries being of any well-known type. In the case of the mold carrier drive, the reduction is accomplished by bevel gears 383, 384 (Fig. 10).

To provide for synchronizing the movements of the conveyor belts 151 and 152, or 152', the blowhead belt 204 and the mold belt 281, suitable phase adjusting or synchronizing mechanisms or differentials 387 and 388 (Figs. 2, 3 and 10), are inserted in the driving connections for the mold belt and the blowhead belt. The mechanisms may be of known constructions suitable for effecting a drive from one part to another, while permitting the two parts to be shifted angularly in respect to each other and locked in their adjusted position.

8. General operation

It will be understood that the glass conveyor, the blowhead belt and the mold belt are all driven in such direction that in moving along in their operative runs in the gap between the standards 101—107 they are moved in unison from the feed end to the delivery end at a speed that is proper to permit the fabrication of the articles 82 to be blown. The rolls 71—72 (Figs. 1 and 11) or 71'—72' (Fig. 36) are rotated at such peripheral speed that they deliver a ribbon of glass to the conveyor at approximately the rate of travel of the latter. If the ribbon is not provided with bosses, the thickness of the ribbon is such that the mass of glass contained therein, within an area defined by the periphery of the orifices 156 or 156' (Figs. 14 and 36) of the conveyor, is sufficient to furnish the amount of glass to be fabricated into the product of the machine. If a ribbon having bosses is used, the thickness of the bosses (Figs. 42 and 43) should be such as to furnish the necessary glass and the pocket roll is so adjusted by the differential 117 that the orifices will receive the bosses on the ribbon when the latter is deposited thereon. It will of course be further understood that the regulator 53 of the forehearth 51 is adjusted to cause the issue of a proper amount of glass from the furnace.

The glass 78 in passing through the forming pass is flattened into a ribbon, and laid, as it is formed, upon the conveyor passing therebeneath. The conditions of flow are preferably such that there is but slight piling up, if any, of the glass above the pass, the action of the rolls being on the whole to flatten the stream directly into a ribbon. Due to the relation of the parts, and the speed at which this is performed, this can be accomplished without cooling the outer layer of the ribbon to the same extent that the outer layers of blanks or parisons are generally cooled in other processes in which the skin resulting therefrom is relied upon to prevent the deformation of the blank or parison prior to shaping the same to form. Nor is such a cool skin formed by contact with the conveyor on those parts of the ribbon which are over the orifices in the conveyor. As a result, the glass over such orifices starts under gravity pull to sag down through the same, as best shown in Figs. 14 and 42, shortly after being deposited thereon, the peripheries of the orifices limiting the glass available for this purpose. This anchors the glass to the conveyor. If the raised type of orifice is used the glass is further anchored by the orifice lips. This anchoring of the ribbon is important in assuring proper delivery of the ribbon to the conveyor and, in certain aspects of the invention, the continuity of the ribbon subsequent to the anchoring is not essential, this being especially true after the blowheads have seated to make a further anchor.

The travel of the conveyor brings the entire ribbon under the operative run of the blowing mechanism and the blowheads descend on the glass above the orifices, effecting a seal. In the further travel of the ribbon conveyor and blowheads air is admitted to each of the latter from the blowbox 201 or 201' at predetermined times to puff the glass settling through the orifices, and to finally blow the same in the molds 280 which have been closed thereon and rotate. As the blown articles 82 approach the delivery end of the machine the two parts of the molds in which they have been blown separate, leaving the articles 82 suspended from the ribbon 79 or 79' (Figs. 2, 15 and 44). The rotation of the molds stops with the halves on opposite sides of the longitudinal plane of the machine.

An embodiment of this invention in a machine of the construction disclosed, having 112 links in the ribbon conveyor, 74 links in the blowing mechanism belt, and 52 links in the mold belt, with a linear speed of 50 feet per minute in the several belts, has produced 123 electric lamp bulbs per minute, each bulb being of a diameter of 2.375 inches, using a link pitch or length of 4.875 inches, and drive sprockets of 9.311 inches pitch diameter rotated at a speed of 20.5 R. P. M.

The ribbon, as it leaves the forming pass 77, does not adhere to the periphery of the forward roll 72 or 72' as the latter moves down, but hangs vertically until just before it reaches the conveyor, at which point it assumes a catenary curve owing to the forward travel of the conveyor (Fig. 11). The speed of the ribbon conveyor is adjusted so that it carries the ribbon forward at a sufficiently rapid rate to compensate for any substantial elongation of the latter under the influence of gravity. Hence the ribbon, which is in effect a parison from which a number of articles are to be formed, is supported from the time of its formation until it is deposited on the conveyor, and hence needs no chilled skin to hold it in shape, as is the case with parisons which are transferred in air from point to point. It will also be noticed that, as the article is formed from the glass of the ribbon over the orifices, there is no subsequent chilling, save that due to air, of the glass forming the article. This is shown by the rapidity with which the glass of the ribbon sags by gravity through the orifices, and by the fact that completed bulbs have a perfect surface. The adjustment of the conveyor speed to one sufficiently high above the speed of formation to compensate for elongation is of importance in preventing the swaying or wavering of the ribbon as it feeds to the conveyor, and the consequent piling up of glass thereon.

It will be obvious that, by means of the mechanism described above for effecting a longitudinal adjustment of the mold mechanism along the machine, and the mechanism for effecting a vertical adjustment of the blowing mechanism and the mold mechanism, the machine can be adjusted for ware of widely differing shapes and sizes.

What is claimed is:

1. The hereinbefore described process of making blown glass articles which comprises forming a ribbon of glass from a parent body and progressively and sequentially blowing articles from the glass of the ribbon as it moves away from its point of origin.

2. The hereinbefore described method of making glass articles, which comprises forming a ribbon of glass, moving the same as it is formed from its point of origin and fabricating a plurality of articles from the ribbon progressively and sequentially while being so moved.

3. The hereinbefore described method of making glass articles which comprises forming a ribbon from plastic glass and while the ribbon has heat of formation progressively and sequentially acting on the same to form a plurality of articles from the ribbon, the steps in the formation of one article overlapping the steps in the formation of another of said articles.

4. The hereinbefore described method of making blown glass articles which comprises flowing glass from a parent body to form a plurality of connected parisons connected in a ribbon, allowing portions of each parison to elongate by gravity and blowing such elongated portions into shape while parisons connected therewith are being formed, the steps in the formation of one article overlapping the steps in the formation of another of said articles.

5. The hereinbefore described method of making blown glass articles which comprises forming a ribbon of glass, receiving the ribbon on a uniformly moving continuous surface having orifices therein, anchoring the glass in ribbon form to the surface by the settlement of parts of the ribbon into the orifices, and blowing the glass adjacent to the orifices into form.

6. The hereinbefore described method of forming glass articles which comprises issuing glass from a melting furnace and forming it into a ribbon, depositing said ribbon on a perforated uniformly traveling conveyor, and anchoring the ribbon to the conveyor by the settlement of portions of the ribbon through the perforations of the conveyor while such portions are connected with the glass in the furnace.

7. The hereinbefore described method of making glass articles which comprises forming a ribbon of plastic glass, supporting the ribbon on a uniformly traveling apertured carrier, while it retains the heat of formation, anchoring the ribbon on the carrier by the settling of glass through the apertures in the carrier, and forming a plurality of articles from said ribbon by progressively and sequentially acting on the glass adjacent to the several apertures in the carrier.

8. The hereinbefore described process of making blown glass articles which comprises forming a ribbon of glass by passing glass from a parent body through a forming pass, depositing the ribbon as formed directly from the walls of the pass on an apertured carrier, and blowing through such apertures to form articles from the glass adjacent thereto.

9. The hereinbefore described process of making blown glass articles which comprises forming a ribbon of glass by passing glass from a parent body through a forming pass between rolls, depositing the ribbon as formed directly from the parts forming the pass on an apertured conveyor, allowing portions of the ribbon to sag downwardly through the apertures in the conveyor and blowing out the sagged portions by air pressure applied above the apertures.

10. The hereinbefore described method of forming glass articles which comprises issuing glass from a melting furnace in a stream, flattening the issued glass while in stream form into a ribbon by passing it through a forming pass, depositing said ribbon on an apertured traveling conveyor, and anchoring the ribbon to the conveyor by the settlement of portions of the ribbon through the apertures of the conveyor, while such portions are connected with the glass in the furnace.

11. The hereinbefore described method of making glass articles which comprises forming a ribbon of glass with bosses thereon, depositing the ribbon as formed on a moving carrier having orifices therein, with the bosses above the orifice, passing glass of the bosses through the orifices and fabricating the glass so passed through the orifices into the desired articles.

12. The hereinbefore described process of making blown glass articles which comprises forming a ribbon of glass by passing glass from a parent body through a forming pass between rolls, one of which is recessed, and blowing articles from the bosses formed on the ribbon by the recess in the roll as the ribbon and bosses thereon move away from the pass.

13. The hereinbefore described method of forming glass articles which comprises issuing a stream of glass from a furnace, flattening the issued glass into a bossed ribbon by passing it while still in stream form between rolls, one of which has pockets therein, depositing the bossed ribbon on a moving continuous surface having orifices therein, with the bosses of the ribbon above the orifices, permitting glass of bosses to sink through the orifices to anchor the ribbon to the conveyor, and forming articles from the glass passing through such orifices.

14. The hereinbefore described method of making glass articles which comprises acting on a stream of glass by rolls to flatten the same into a ribbon having bosses thereon, depositing the ribbon on a continuous surface having orifices therein, moving at such speed in respect to the speed of ribbon formation that the ribbon hangs out of contact with the rolls after leaving the forming pass thereof, permitting the glass of the ribbon above the orifices in the carrier to settle through the same, while the ribbon has heat of formation, successively segregating a portion of the ribbon adjacent to each orifice from the balance of the ribbon by a member moved in unison with the carrier, enclosing the glass below such orifice in a mold, applying air pressure above the segregated portion of glass, and then separating the blown article thus formed below the orifice from the glass above the orifice.

15. In a glass forming machine the combination with a moving conveyor, comprising a plurality of articulated sections, the conveyor having on its operative run a continuous glass supporting surface with orifices therein of glass shaping elements below and moving with the operative run of the conveyor, and means for depositing a plastic ribbon of glass on the conveyor.

16. In a glass forming machine the combination with a moving conveyor comprising articulated links moving in a horizontally closed path, and plates supported by the links, forming on the operative run of the conveyor a continuous glass supporting surface having orifices therein of glass shaping elements below and moving with the operative run of the conveyor, and means for depositing a plastic ribbon of glass on the conveyor.

17. In a glass forming machine the combination with a link belt moving in a horizontally closed path, and plates hinged on the links and forming on the operative run of the conveyor a continuous glass supporting surface having orifices therein of glass shaping elements below and moving with the operative run of the conveyor, and means for depositing a plastic ribbon of glass on the conveyor.

18. In a glass forming machine, the combination, with a ribbon forming mechanism, of a belt moving in a horizontal path and comprising a series of links each having a plate pivoted thereon on a horizontal axis, the plates having orifices therein and forming on one run of the belt a continuous surface to receive and support a plastic ribbon of glass deposited thereon by the ribbon forming mechanism, glass shaping elements below and moving with one run of the belt and means for maintaining the plates horizontal during at least a portion of such run.

19. In a glass forming machine, the combination with a pair of forming rolls, of a moving conveyor adapted to receive a plastic ribbon of glass directly from the pass of the rolls, and having on the operative portion of its run a continuous glass supporting surface with orifices therein, and glass shaping elements below and moving with the said operative portion of the run.

20. In a glass forming machine, the combination with a pair of rolls having a forming pass between them, one of the rolls having pockets therein to form a bossed ribbon of glass, of a traveling conveyor having orifices therein moving in a closed path below the rolls to receive the ribbon as formed, and means for shifting the rolls relatively to the conveyor to cause the bosses upon the ribbon to register with the orifices.

21. In a glass forming machine, the combination with a pair of rolls having a forming pass between them, one of the rolls having pockets therein to form a bossed ribbon of glass, of a traveling conveyor having orifices therein, moving in a closed path below the rolls to receive the ribbon as formed, and means for shifting the phase relation between the cycle of rotation of the pocket roll and the conveyor.

22. In a glass forming machine, the combination with a pair of forming rolls, of a moving conveyor adapted to receive a plastic ribbon of glass from the pass of the rolls, and having on the operative portion of its run a continuous glass supporting surface with orifices therein, and mold mechanisms moving with and below the operative run of the conveyor.

23. In a glass forming machine, the combination of a ribbon forming mechanism comprising a pair of rolls with a forming pass between them, a continuously moving conveyor receiving on its upper face a ribbon directly from the pass, the conveyor having orifices therein, and glass finishing mechanisms moving in unison with the conveyor and cooperating with the glass on the conveyor adjacent to the orifices to fabricate articles from glass passing through the orifices.

24. In a glass forming machine, the combination of a ribbon forming mechanism comprising a pair of rolls with a forming pass between them, one of the rolls having pockets therein to form a bossed ribbon, a continuously moving conveyor receiving on its upper face the ribbon directly from the pass, the conveyor having orifices therein and receiving on its upper face the ribbon directly from the pass with the bosses thereon above the orifices, and glass finishing mechanisms moving in unison with the conveyor and cooperating with the glass of the bosses to fabricate articles from such glass after passing through the orifices.

25. The combination with a conveyor having a continuous glass supporting surface with orifices therein, of a moving belt comprising a plurality of articulated shoes carrying blowheads, with resilient means for projecting the blowheads toward the conveyor.

26. The combination with a conveyor having a continuous glass supporting surface with orifices therein, of a moving belt comprising a plurality of articulated shoes carrying blowheads, resilient means for projecting the blowheads toward the conveyor, and means actuated by the travel of the belt to retract and release the blowheads.

27. The combination with a conveyor having a continuous glass supporting surface with orifices therein, of a stationary blowbox, a belt comprising a plurality of articulated sections, moving with the conveyor past the blowbox, blowheads mounted on the sections and resiliently projected toward the conveyor, and shoes carried on the sections and resiliently pressed against the blowbox.

28. The combination with a ribbon forming mechanism, a conveyor having a continuous surface moving past the same and receiving a ribbon of glass therefrom, the conveyor having blowing orifices therein, and blowing mechanisms moving with the conveyor and acting on glass thereon adjacent to the orifices.

29. The combination with a ribbon forming mechanism of an endless conveyor moving in a closed horizontal path and receiving a ribbon of glass from the ribbon forming mechanism, and a series of blowing mechanisms moving in a vertically closed path, part of which is straight, above and adjacent to a part of the path of the ribbon carrier.

30. In a glass blowing machine the combination with a ribbon forming means, of a moving glass conveyor on which a plastic ribbon of glass is deposited from the ribbon forming means, the conveyor in one part of its run having a continuous upper surface with orifices therein, and a series of blow heads and a series of molds, each moving in closed paths, a part of each of which is adjacent to that part of the path of the ribbon carrier in which it has a continuous surface.

31. In a glass blowing machine the combination with a ribbon forming means, of a moving glass conveyor, the conveyor in one part of its run having a continuous upper surface with orifices therein and a series of blowheads and a series of molds, each moving in closed paths, one part of the blowhead path being on one side of such run of the conveyor and a part of the path of the mold being on the other side of such run of the conveyor.

32. In a glass blowing machine the combination of a ribbon conveyor moving in a closed horizontal path and having a continuous glass supporting surface with orifices therein in a part of its run, of a stationary blowbox located above and adjacent to such operative run, connected blowing mechanism moving in a closed horizontal path between such run of the conveyor and the blowbox, and cooperating with each of them, and mold mechanism moving in a closed vertical path in cooperative relation with the operative run of the conveyor.

33. In a glass forming machine the combination of a moving ribbon conveyor having orifices therein, of a stripper adjacent to the conveyor and rotating in a plane inclined to the face of the conveyor.

34. In a glass forming machine the combination of a moving ribbon conveyor having orifices therein, means for forming articles below the orifices from the glass of the ribbon, and means for lifting the ribbon from the conveyor to separate the articles from the ribbon.

35. In a glass forming machine the combination of a ribbon conveyor having orifices therein, means for forming articles below the orifices from the glass of the ribbon, and means for separating the articles from the ribbon comprising a disc rotating on an axis inclined to the surface of the conveyor and entering between the ribbon and such surface.

36. In a glass forming machine the combination of a moving ribbon conveyor having orifices with sharpened upper edges therein, blowheads cooperating with the said edges to thin the ribbon adjacent thereto, and to blow articles pendent from the orifices, and means entering between the ribbon and the surface of the conveyor to lift the ribbon from the conveyor after the formation of such articles.

37. In a glass blowing machine the combination of a ribbon forming mechanism, comprising a pair of rolls with a forming pass between them, one of the rolls having pockets therein to form bosses on the ribbon, a conveyor comprising a series of articulated links moving in a closed horizontal path, the several links carrying plates which in the operative run of the conveyor form a continuous ribbon supporting surface provided with orifices having sharpened upper edges, a stationary blowbox located above a part of the operative run of the conveyor having a channelled bottom with ports therein, blowheads moving in a closed vertical path a part of which is straight and is between the blowbox and the operative run of the conveyor, the belt comprising a series of articulated links, shoes resiliently carried by the links in contact with the box, conoidal blowhead movably mounted on the links and connected with the ports in the corresponding shoes, means for resiliently projecting the blowhead toward the conveyor in registration with the orifice therein, means actuated by the travel of the belt to retract and release the blowhead, connected mold means moving in a closed vertical path beneath the operative run of the conveyor, each mold mechanism consisting of a separable mold and means for opening and closing the same and for rotating the molds and arresting their rotation with the mold parts at opposite sides of the line of travel of the center of the molds, and means for lifting the ribbon from off the conveyor comprising a disc entering between the two and rotating in a plane at an angle to the surface of the conveyor.

38. The hereinbefore described method of making glass articles, which comprises forming a continuous ribbon of glass and progressively and sequentially fabricating, by altering the shape of portions of glass of ribbon while the ribbon is in motion from its point of origin, a plurality of articles.

39. The hereinbefore described method of making blown glass articles which comprises forming a ribbon of glass, depositing the ribbon so formed on a uniformly moving continuous surface having orifices therein, and blowing the glass adjacent to the orifices into form.

40. The hereinbefore described method of forming glass articles which comprises continuously issuing glass from a melting furnace and thereafter forming it into a continuous ribbon, moving said ribbon continuously forward as formed and fabricating parts of the said ribbon into articles by the cooperation of blowing and molding mechanisms while the ribbon is so moving continuously forward.

WILLIAM J. WOODS.
DAVID E. GRAY.